(12) United States Patent
Baarman et al.

(10) Patent No.: US 8,558,411 B2
(45) Date of Patent: Oct. 15, 2013

(54) POWER SUPPLY

(75) Inventors: David W. Baarman, Fennville, MI (US);
William T. Stoner, Jr., Ada, MI (US);
Hai D. Nguyen, Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 274 days.

(21) Appl. No.: 12/842,421

(22) Filed: Jul. 23, 2010

(65) Prior Publication Data

US 2011/0018360 A1    Jan. 27, 2011

Related U.S. Application Data

(60) Provisional application No. 61/228,192, filed on Jul. 24, 2009.

(51) Int. Cl.
*H01F 27/42* (2006.01)
*H01F 37/00* (2006.01)
*H01F 38/00* (2006.01)

(52) U.S. Cl.
USPC .......................... 307/104; 320/115

(58) Field of Classification Search
USPC .................................. 307/104
See application file for complete search history.

(56) References Cited

U.S. PATENT DOCUMENTS

| | | | |
|---|---|---|---|
| 6,127,809 A | 10/2000 | Kates et al. | |
| 6,191,552 B1 | 2/2001 | Kates et al. | |
| D611,407 S | 3/2010 | Webb | |
| 7,791,312 B2 | 9/2010 | Kook | |
| 7,936,147 B2 | 5/2011 | Kook | |
| 2007/0279002 A1* | 12/2007 | Partovi | 320/115 |
| 2008/0252252 A1 | 10/2008 | Wong | |
| 2008/0265836 A1* | 10/2008 | Inoue et al. | 320/110 |
| 2009/0033564 A1 | 2/2009 | Cook et al. | |
| 2010/0194206 A1 | 8/2010 | Burdo et al. | |
| 2010/0201312 A1 | 8/2010 | Kirby et al. | |
| 2010/0219697 A1* | 9/2010 | Azancot et al. | 307/104 |
| 2010/0328044 A1* | 12/2010 | Waffenschmidt et al. | 340/10.4 |

FOREIGN PATENT DOCUMENTS

| | | |
|---|---|---|
| EP | 1 720 230 | 11/2006 |
| EP | 1986304 | 10/2008 |
| EP | 2211438 | 7/2010 |
| WO | 2006/101285 | 9/2006 |
| WO | 2008093334 | 8/2008 |
| WO | 2009040807 | 4/2009 |
| WO | 2009/065099 | 5/2009 |
| WO | 2009/081115 | 7/2009 |
| WO | 2009147664 | 12/2009 |

OTHER PUBLICATIONS

International Searching Authority, Invitation to Pay Additional Fees, International Application No. PCT/US2010/043047, International Filing Date Jul. 23, 2010.

(Continued)

*Primary Examiner* — Rexford Barnie
*Assistant Examiner* — Toan Vu
(74) *Attorney, Agent, or Firm* — Warner Norcross & Judd LLP

(57) ABSTRACT

In one aspect, the present invention provides a universal power supply for wired and wireless electronic devices. In a second aspect, the present invention provides a universal power supply that is reconfigurable to provide a wide range of power supply options.

16 Claims, 18 Drawing Sheets

(56) References Cited

OTHER PUBLICATIONS

PCT Written Opinion of the International Searching Authority, PCT/US2010/043047, Feb. 2, 2012.

Circuit Schematic of a portion of a Water Treatment System, dated Oct. 21, 2002.

* cited by examiner

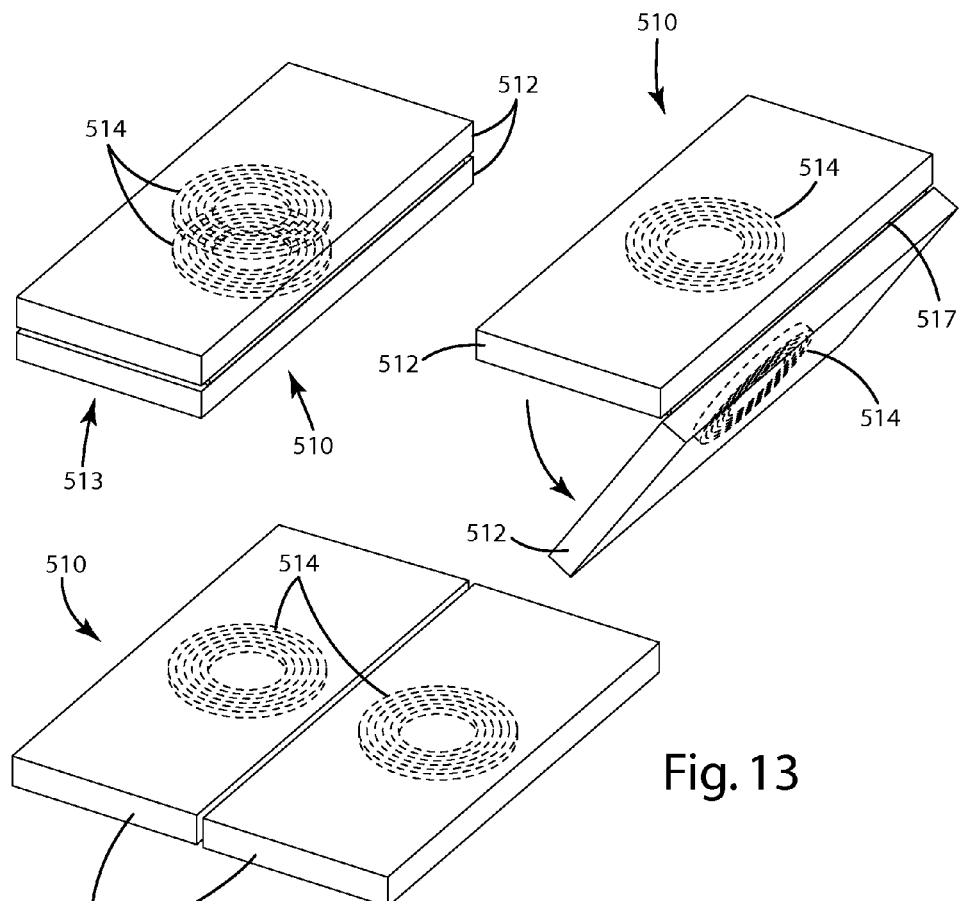
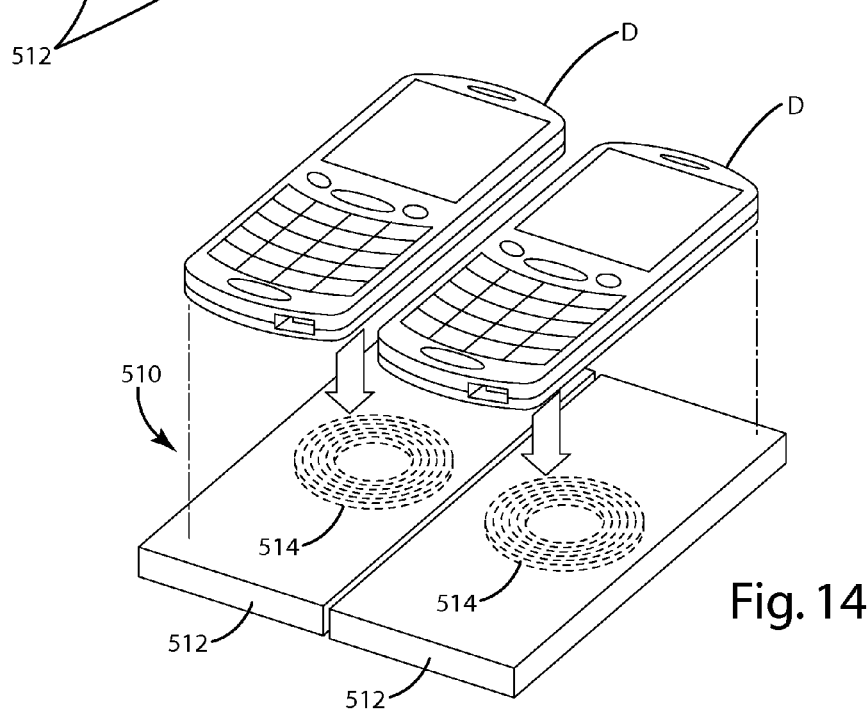
Fig. 13
Fig. 14

POWER SUPPLY

BACKGROUND OF THE INVENTION

The present invention relates to power supplies and more particularly to power supplies capable of supplying power to a variety of alternative devices.

There continues to be dramatic growth in the use of portable electronic devices, such as laptops, personal digital assistants, cellular phones, smart phones and portable media players. Although a variety of standards have been developed for providing wireless communication with electronic devices, many of these devices continue to be plagued by the need for a power supply that is connected to the electronic device by a cord. Typically, each power supply includes a power adapter for converting AC mains power into the DC power required by the device along with cords for connecting the input of the adapter to a wall outlet and the output of the adapter to the electronic device. In some cases, a plug extends from the adapter so that the adapter plugs directly into a wall outlet and only a single cord from the adapter to the electronic device is required (See FIG. 1). Power adapters (often referred to as "bricks") are relatively heavy and occupy a large amount of space. Conventional power supply systems suffer from a variety of disadvantages. For example, the power supply with adapter and associated cords is a burden to use, store and carry around as needed. In use, cords create an unsightly and often unmanageable mess. Further, when connected, cords impede device mobility. With multiple portable devices, a user may be required to carry around multiple power supplies, including multiple power adapters and multiple cord sets. This only compounds the problem.

In an effort to reduce the problem, "universal" power supplies have been developed. Efforts to provide a universal power solution are complicated by a variety of practical difficulties. One of these difficulties arises because different portable electronic devices have different power requirements. A conventional universal power supply includes a single power adapter that is capable of providing power to multiple devices. For example, a conventional universal power supply is illustrated in FIG. 2. In this embodiment, the power supply includes a power adapter having multiple power outlet ports. The power adapter is configured to supply a predetermined amount of power to each outlet port. Various electronic devices, such as laptops and smart phones can be connected to the power adapter using conventional cords. Although a marked improvement, this solution still requires a separate cord for each device connected to the power supply. Further, typical solutions require the electronic devices to be preconfigured to accept the predetermined power output by the power supply.

As an alternative to corded power supply solutions, there has recently been dramatic growth in the pursuit of wireless power solutions. Wireless power supply systems eliminate the need for power cords and therefore eliminate the many inconveniences associated with power cords. For example, wireless power solutions can eliminate: (i) the need to retain and store a collection of power cords, (ii) the unsightly mess created by cords, (iii) the need to repeatedly physically connect and physically disconnect remote devices with cords, (iv) the need to carry power cords whenever power is required, such as recharging, and (v) the difficulty of identifying which of a collection of power cords is used for each device.

The introduction of wireless power solutions has in one respect made power management across multiple devices more complicated—at least in the short term. For example, a user that has both wirelessly powered/charged devices and devices that are powered/charged using wires will be required to carry both wired and wireless power supplies. Even if the user has invested in a universal power supply for all of the users wired devices, a separate wireless power supply will be required.

SUMMARY OF THE INVENTION

In one aspect, the present invention provides a universal power supply that is capable of supplying power to a variety of both wired and wireless electronic devices. In one embodiment, the power supply includes an integrated wireless power transmitter and one or more power outlets for wired power supply. In those embodiments in which the power supply includes multiple power outlets, different power outlets may supply different amounts of power. Different plug shapes may be provided to differentiate between different amounts of power. In other embodiments, all of the power outlets may provide the same amount of power. In embodiments of this nature, the power ports may be conventional USB ports that include power in accordance with USB standards.

In an alternative embodiment, the power supply may include power outlets configured to receive removable wireless power transmitters, such as removable primary coils. In some embodiments, different plug shapes may be provided to differentiate between power outlets for wireless transmitters and power outlets for wired devices. In some embodiments, the plug shapes may be the same and the electronics of the power adapter may be capable of determining what has been plugged into a given power outlet and provide that power outlet with the appropriate power.

In a second aspect, the present invention provides a universal wireless power supply having a plurality of wireless power transmitters powered by a single power adapter. In one embodiment, the power adapter includes a plurality of integrated power transmitters and is configured to provide freedom of movement of the power transmitters. In one embodiment, the power transmitters may be connected to the power adapter by flexible connectors that permit the assembly to be folded up to reduce space. The flexible connectors may also provide the power transmitters with some degree of positional freedom.

In another embodiment of the second aspect, the power adapter may include a plurality of sections that are movably connected to one another. Separate power transmitters may be located in different sections so that movement of one section with respect to another provides positional freedom between power transmitters. The sections may be joined by a hinge, a pivot joint or other suitable mechanical structure.

In another embodiment, the power supply may include a power adapter having power outlet ports capable of selectively receiving a plurality of wireless power transmitters. One or more power transmitters may be selectively connected to the power supply, as desired. In one embodiment, each wireless power transmitter may include one or more power outlet ports for further wireless power transmitters so that wireless power transmitters may be daisy-chained.

In the first aspect, the present invention provides a universal power supply that is capable of supplying power to both wired and wireless electronic devices. In this aspect, the present invention provides a convenient, easy to use power supply that can be used for a wide variety of devices, thereby eliminating the need to carry multiple power supplies even when a user would like to power both wired and wireless devices. In a second aspect, the present invention provides a wireless power supply that is adaptable to different applications. In those embodiments with movable power supply sections, the power supply can be configured for easy storage and reconfigured to provide convenient wireless charging for devices of various types. In those embodiments with removable power supply transmitters, the size of the power supply can be kept to a minimum by adding only those power supply transmitters needed. The wireless power supply also adds the additional benefit of allowing inherent intrinsic safety. This element allows for high voltage within the power supply to be used with an inherent intrinsic safety. Power supply grounding and insulation can be more simple and cost effective that traditional power supplies. This also increases the safety and reliability of such power supplies. These power supplies can also include the an ultra low power option for minimum standby, such as the system described in U.S. Patent Publication 2010/0084918, filed on Oct. 2, 2009 entitled Power System, which is herein incorporated by reference in its entirety.

These and other objects, advantages, and features of the invention will be more fully understood and appreciated by reference to the description of the current embodiment and the drawings.

BRIEF DESCRIPTION OF THE DRAWINGS

FIG. 13 is a series of illustrations showing a power supply in accordance with an embodiment of the second aspect of the present invention.

FIG. 14 is an illustration showing the placement of electronic devices on the power supply of FIG. 13.

DESCRIPTION OF THE CURRENT EMBODIMENT

Figure 1:
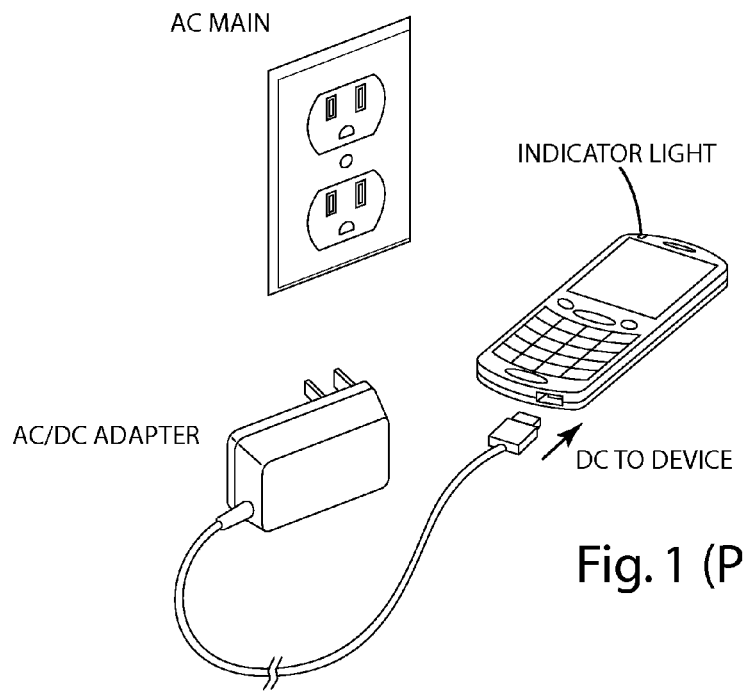
FIG. 1 is an illustration of an electronic device with a conventional wired power supply.
Figure 2:
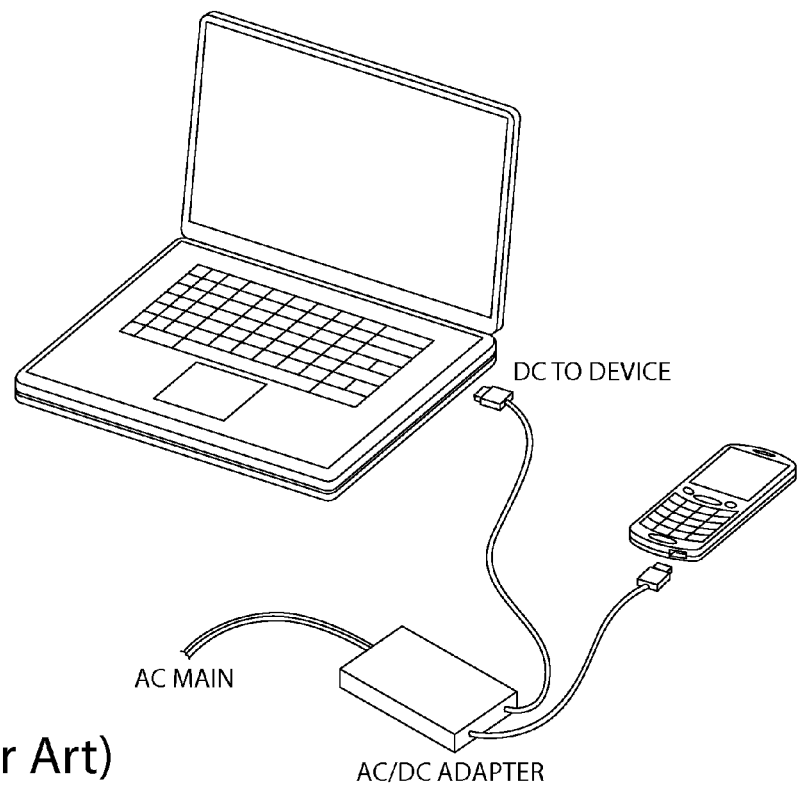
FIG. 2 is an illustration of a pair of electronic devices with a conventional multiple output wired power supply.
Figure 3:
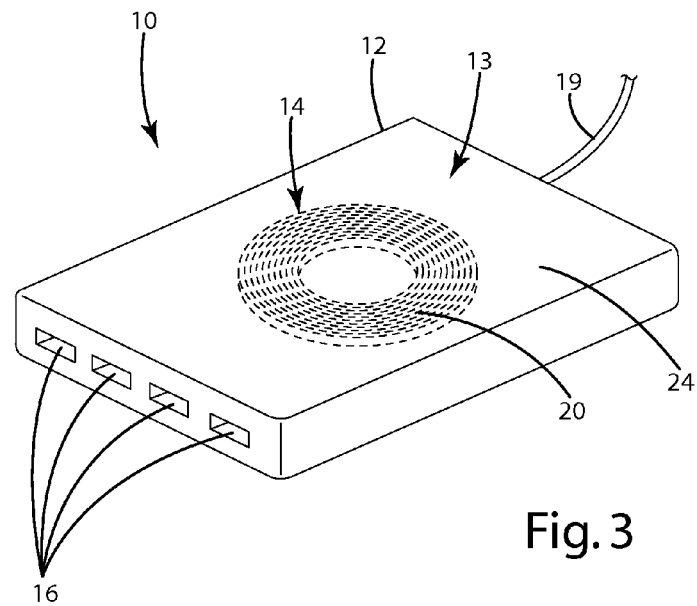
FIG. 3 is an illustration of a power supply in accordance with an embodiment of the first aspect of the present invention.

A power supply in accordance with an embodiment of one aspect of the present invention is shown in FIG. 3. The power supply 10 generally includes a power adapter 13 with a wireless power transmitter 14 to provide power to wireless electronic devices D and a plurality of power outlet ports 16 to provide power to wired electronic devices WD. The power adapter 13 includes the electronics required to convert AC mains power into the power required by the electronic devices. The wireless power transmitter 14 may be integrated into the power adapter 13 or may be attached to the power adapter 13 via a port 18 (shown in FIG. 4). In use, a user can attach a wired device WD to the power supply 10 using a conventional cord C inserted into the appropriate power outlet port 16. The wired device WD may use the power for operation and/or for charging an internal battery. Multiple wired devices WD can be connected to the power supply 10 using separate cords C inserted into different power outlet ports 16. Wireless devices D can be placed in close proximity to the wireless power transmitter 14 to wirelessly receive power (for example, for charging or operating). A variety of alternative embodiments of this first aspect of the present invention are disclosed.

A power supply in accordance with a second aspect of the present invention is shown in FIG. 13. In this embodiment, the power supply 510 generally includes a power adapter 513 with a plurality of wireless power transmitters 514. The power adapter 513 includes a plurality of sections that are movable with respect to one another. In this embodiment, the sections are joined along a hinge or fold line that permits the two sections to be folded and unfolded as desired. Each section includes one or more wireless power transmitters so that movement of the sections results in selective variation in the position and orientation of the wireless power transmitters. As with the first aspect of the present invention, a variety of alternative embodiments of the second aspect of the present invention are disclosed.

As noted above, the first aspect of the present invention provides a power supply 10 that is capable of wirelessly providing power to at least one wireless electronic device D using a wireless power transmitter and to at least one wired electronic device WD using one or more power outlet ports 16. One embodiment of this aspect of the present invention is shown in FIG. 3. FIG. 3 shows a power supply 10 having an integrated wireless power transmitter 14 and a plurality of power outlet ports 16 disposed in a housing 12. The power supply 10 includes a power input cord 19 for connecting the power supply 10 to AC mains, for example, via a wall plug (not shown). The internal circuitry (described in more detail below) of the power supply 10 transforms the AC mains power into the power for a plurality of wired and wireless electronic devices.

In the illustrated embodiment, the power supply 10 is configured to wirelessly supply power using generally conventional inductive power transfer techniques and apparatus. For example, the wireless power transmitter 14 may produce an electromagnetic field that may be picked up and used to generate power in a wireless electronic device D. The wireless power transmitter 14 of this embodiment is a primary coil of wire 20 configured to produce an electromagnetic field suitable for inductively transmitting power to a wireless electronic device D. Similarly, the wireless electronic device of this embodiment includes a secondary coil 22 of wire configured to generate power when placed in the presence of a suitable electromagnetic field. Although the illustrated embodiments utilize inductive techniques to wirelessly transfer power to the wireless device, the power supply 10 may alternatively (or in addition) use other forms of wireless power transfer.

In this illustrated embodiment, the power supply 10 includes a generally rectangular housing 12. The size, shape and configuration of the housing 12 may vary from application to application. A plurality of power outlet ports 16 are mounted within the housing 12 for supplying power to wired devices. The power outlet ports 16 may be conventional USB ports that receive conventional USB plugs and supply power in accordance with applicable USB standards. This permits the power supply 10 to provide power to essentially any wired device capable of being charged through a conventional USB port. The number and type of power output ports 16 may vary from application to application depending on the number and types of devices to be powered by the power supply 10. For example, the type of ports may vary to allow the power supply to power devices that are not compatible with USB standards. In the illustrated embodiment, the power outlet ports 16 are disposed in the end wall of the housing opposite the end wall in which the power cord 19 enters the housing 12. The power outlet ports may, however, be disposed in essentially any location about the housing 12.

The wireless power transmitter 14 is mounted within the housing 12 and is disposed beneath the top surface 24 in the illustrated embodiment. This permits a wireless device to be placed on top of the housing 12 to wirelessly receive power. Although the top surface 24 of the housing 12 is planar in the illustrated embodiment, the top surface may by shaped to correspond with the shape of intended wireless devices. For example, the bottom surface of the wireless device D and the top surface 24 of the housing 12 may have corresponding contours so that the wireless device D nests with the top surface 24 of the housing 12. As noted above, the wireless power transmitter 14 of this embodiment is a primary coil 20. The size, shape and configuration of the primary coil 20 may vary from application to application. For example, the diameter of the primary coil 20, the number of turns of wire in the coil 20 and the size of the wire used to form the coil 20 may vary based on the specific application. If desired, a magnet (not shown) may be located in the housing 12, for example, in the center of the primary coil 20, to assist in aligning the primary coil 20 with the secondary coil 22 in a wireless device D. The magnet (not shown) may also assist in holding the wireless device D in position on the housing 12.

Figure 4:
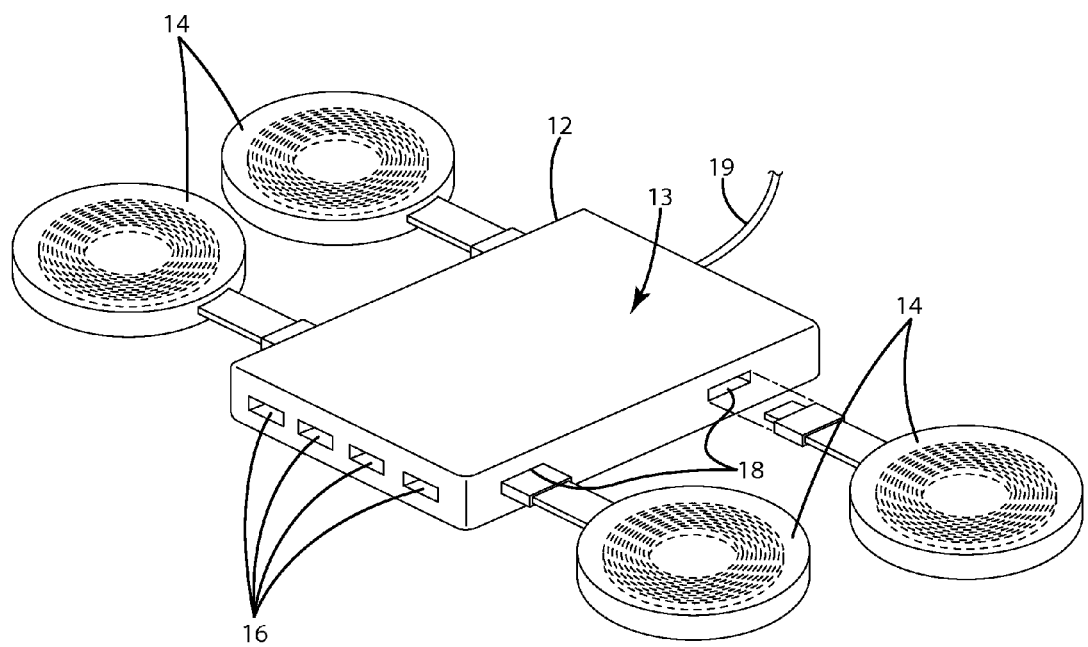
FIG. 4 is an illustration of a first alternative power supply in accordance with an embodiment of the present invention.

FIG. 4 is directed to an alternative embodiment of the power supply 10 in which one or more wireless power transmitters 14 may be selectively connected to the power adapter 13. In this embodiment, a plurality of power outlet ports 16 are provided for supplying power to wired devices, and a plurality of wireless transmitter ports 18 are provided for selectively attaching detachable wireless power transmitters 14. As with the embodiment of FIG. 3, the power outlet ports 16 may be conventional USB ports that receive conventional USB plugs and supply power in accordance with applicable USB standards. This permits the power supply 10 to provide power to essentially any wired device capable of being charged through a conventional USB port. Although this embodiment includes power outlet ports 16, the ports may in some embodiments be eliminated, such that the power supply 10 is configured to supply power only wirelessly. The wireless transmitter ports 18 may be essentially any port capable of selectively receiving a detachable wireless power transmitter. The number and type of wireless transmitter ports 18 may vary from application to application, as desired.

Figure 5:
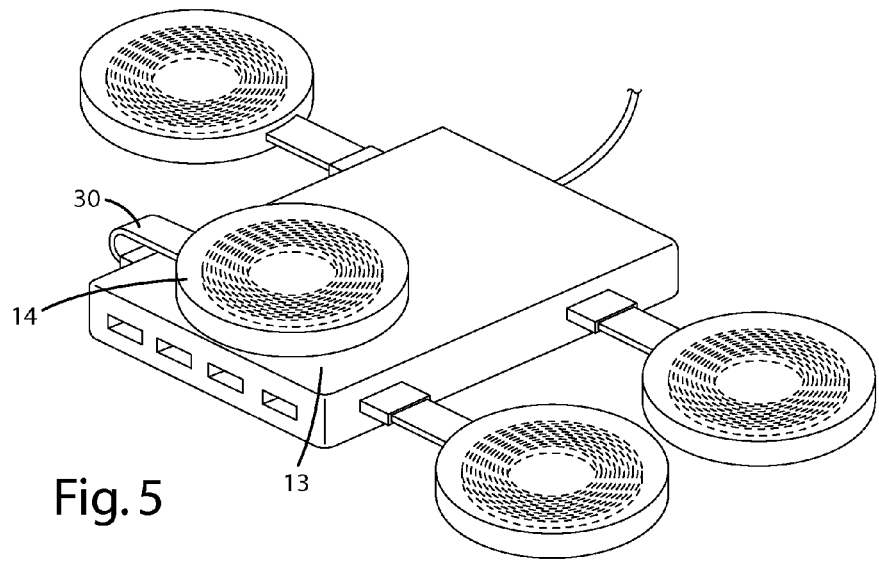
FIG. 5 is an illustration of the first alternative power supply with a detachable coil folded onto the power adapter.

Although the design and configuration of the detachable wireless power transmitters may vary, one embodiment is described with reference to FIG. 6. The detachable transmitter 14 of the illustrated embodiment generally includes a plug 28, a connector section 30 and a coil assembly 32. The plug 28 may be essentially any plug 28 suitable for selectively electrically connecting the detachable transmitter to the power adapter 13. To prevent connection to the wrong port, the plug 28 may be different from the plugs used for the power outlet ports 16. In this embodiment, the connector section 30 may include flexible leads 34 that extend between the plug 28 and the primary coil 20. The flexible leads 34 permit the wireless power transmitters 14 to be folded up onto the power adapter to reduce size, for example, during storage (See FIG. 5). The flexible leads may be essentially any flexible, foldable or otherwise adjustable structure for electrically connecting the plug 28 to the primary coil 20. For example, the flexible leads 34 may simply be a pair of wires or may be a more complicated set of traces on a flexible circuit board substrate. The connector section 30 may be overmolded with a flexible material that protects the connector section 30 while still allowing a high degree of flexibility.

The coil assembly 32 of the illustrated embodiment generally includes a coil 20, a magnet 26 and an overmold 36. In one embodiment, the coil 20 is a spiral-round coil of Litz wire. The size, shape and configuration of the coil 20 may vary from application to application depending in part on the amount of power to be transmitted. For example, the diameter of the coil 20, the number of turns of wire in the coil 20 and the size of the wire used to form the coil 20 may vary based on the specific application. If desired, the coil assembly 32 may include a magnet 26. The magnet 26 may be located at the center of the coil 20 and may provide a way to assist in aligning the coil 20 with the secondary coil 22 in a remote device. The magnet 26 may also assist in holding the coil assembly 32 in a folded configuration for storage (See FIG. 5). The coil assembly 32 may be overmolded for protection and/or for aesthetic reasons. The coil assembly 32 may alternatively be housed in essentially any suitable housing. The overmold or housing 33 may be contoured to correspond in shape with the intended wireless device. This may assist in providing close alignment between the primary coil 20 and the secondary coil 22, and may help to retain the wireless device D in place on the coil assembly 32.

Figure 6:
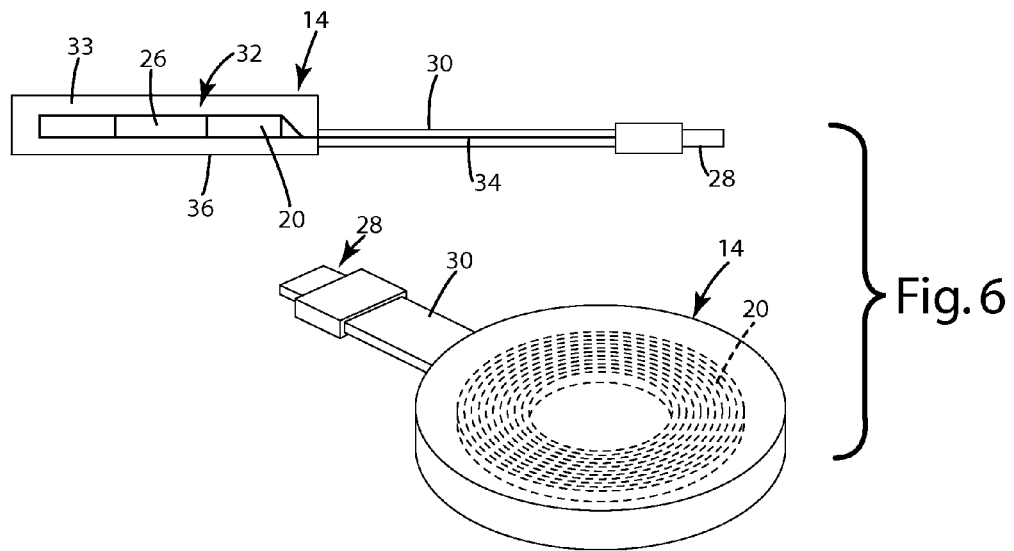
FIG. 6 is a partially sectional illustration of the removable power transmitter.
Figure 7:
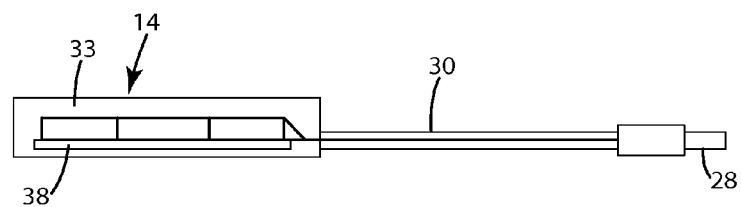
FIG. 7 is a partially sectional illustration of an alternative removable power transmitter.

An alternative detachable wireless power transmitter 14 is shown in FIG. 7. In this embodiment, the detachable wireless power transmitter 14 is essentially identical to the embodiment shown in FIG. 6, except that it is shielded. As shown, a shield 38 is disposed in the coil assembly 32 beneath the coil 20. The shield 38 allow a wireless device D placed on top of the transmitter 14 to receive power, while reducing electromagnet interference and other problems that may be caused by stray electromagnetic field lines. The size, shape and configuration of the shield may vary from application to application, as desired. For example, the shielding material, the diameter of the shielding material and the thickness of the shielding material may vary to provide the desired balance between cost and shielding performance.

In the embodiment shown in FIGS. 6 and 7, the power supply circuitry (not shown) is included in the housing 12. Alternatively, portions of the power supply circuitry may be incorporated into the detachable wireless power transmitters 14. For example, if desired, the DC/DC rectifier, microcontroller, drivers or switching circuits may be integrated into the detachable wireless power transmitter 14 instead of within the housing 12 of the power adapter 13. In one embodiment, the wireless transmitter port may supply a high DC rail output from the AC/DC rectifier to the wireless power transmitter 14, and the wireless power transmitter may include a DC/DC converter, a microcontroller (with an integrated or separate driver) and a switching circuit. This approach may offer more variety in the power supply characteristics available from detachable wireless power transmitters 14 as each one can be designed with the appropriate circuit components rather than relying on multi-channel components.

Figure 8:
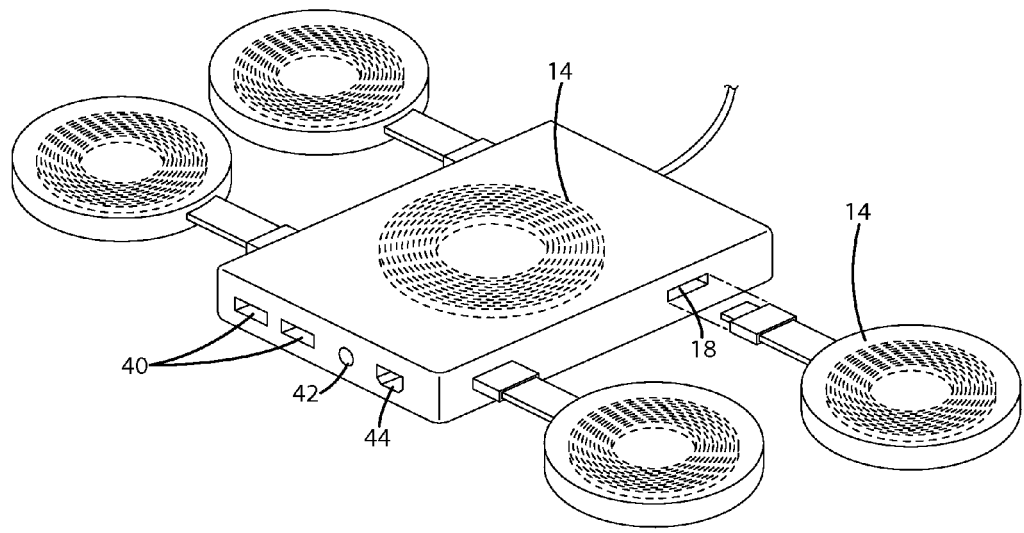
FIG. 8 is an illustration of a second alternative power supply.

FIG. 8 shows another alternative embodiment of the power supply 10. In this embodiment, the power supply 10 generally includes an integrated wireless power transmitter 14, a plurality of wireless transmitter ports 18 for selectively attaching wireless power transmitters 14 and a plurality of power outlet ports 16 for supplying power to wired devices. The integrated wireless power transmitter 14 permits at least one wireless device to receive power without the need for attaching a detachable wireless power transmitter. However, if it is desirable to wirelessly charge more than a single wireless device, additional detachable wireless power transmitters may by connected to the power adapter 13, as desired. In this embodiment, the power supply 10 may include a plurality of different power outlet ports 16. The different power outlet ports 16 may provide different amounts of power to allow power supply to a broader range of wired devices. To facilitate correct attachment of wired devices, the different power outlet ports 16 may have different plug configurations for different amounts of power. For example, in the illustrated embodiment, the power outlet ports 16 may include two conventional USB ports 40, a circular port 42 and a trapezoidal port 44.

Figure 9:
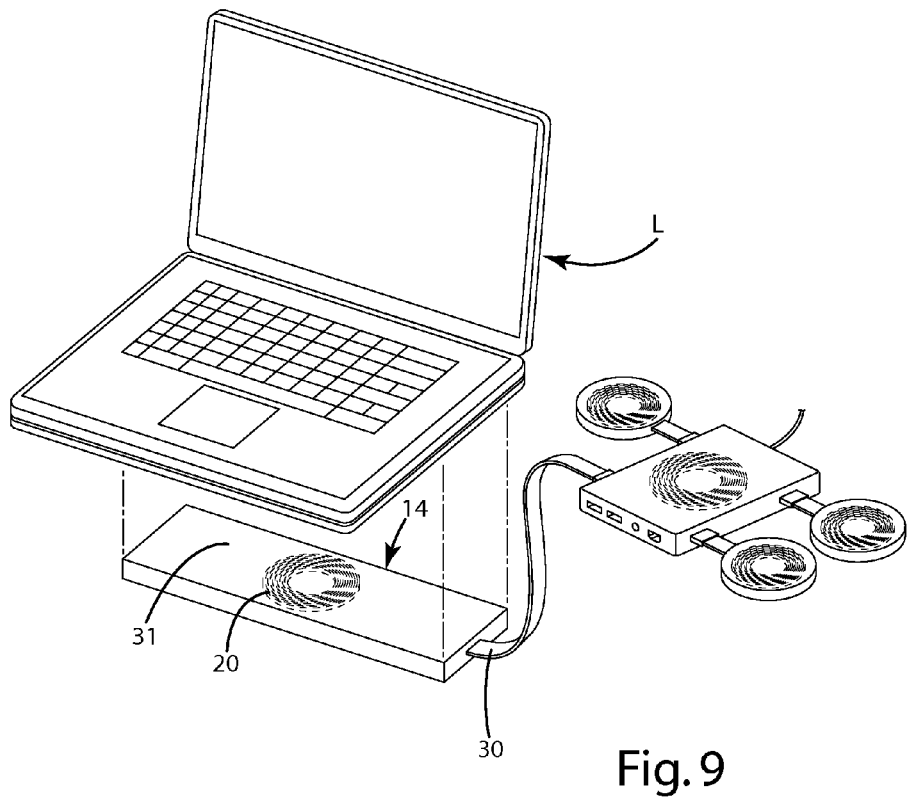
FIG. 9 is an illustration of the second alternative power supply with a wireless computer expansion module.

FIG. 9 shows the power supply 10 of FIG. 8 with an alternative detachable wireless power transmitter 14 configured for use with larger wireless devices, such as laptop L. In this embodiment, the detachable wireless power transmitter 14 is essentially identical to the detachable wireless power transmitter 14 of FIG. 6, except that it includes a longer connector section 30 and a larger support surface 31 housing the coil assembly 32. The support surface 31 of this embodiment is configured to provide a wide support for devices that might teeter on a smaller support. In this embodiment, the coil 20 (along with any desired magnet or shielding) is disposed in a relatively thin, rectangular support surface 31. The support surface 31 may be overmolded onto the coil or the coil 20 may be inserted into a cavity in a premanufactured support surface. Although FIG. 9 shows a single primary coil 20 located in the center of the support, the number and position of primary coils 20 may vary from application to application.

Figure 10:
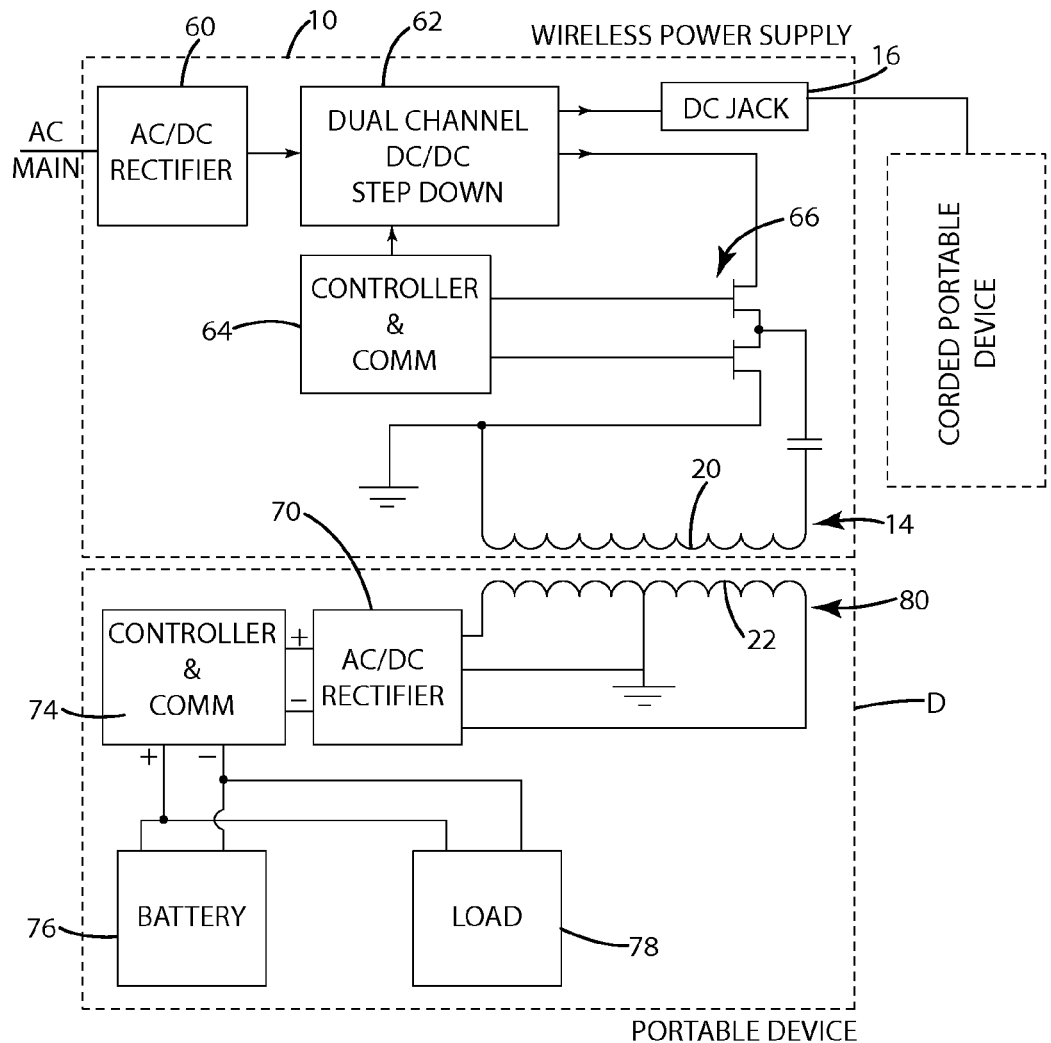
FIG. 10 is a schematic representation of a circuit for the power supply.

FIG. 10 is a schematic representation of a circuit suitable for supplying power to the power supply of FIG. 3. The power supply 10 includes an AC/DC rectifier 60 for converting the AC power received from the AC mains into DC power. The power supply 10 also includes a dual-channel DC/DC step down converter 62 for converting the DC output of the AC/DC rectifier 60 to the desired level. The dual-channel converter 62 includes two different outputs—one for the power output port 16 and one for the wireless power transmitter 14. In applications where additional levels of DC power are required, the DC/DC step down converter may include a multiple-channel DC/DC step down converter or multiple step down converters. The power supply 10 also includes a microcontroller 64 and a switching circuit 66. The microcontroller 64 is programmed to control the switching circuit 66 to generate the appropriate AC power for the coil 20. In this embodiment, the microcontroller 64 also controls operation of the dual-channel converter 62. For example, the microcontroller 64 may send control signals to the dual-channel converter 62 specifying the level of the DC power being supplied to the switching circuit 66. The microcontroller 64 may determine the appropriate DC power level based on signals received from the wireless device. These signals may be communicated from the wireless device to the power supply 10 by reflected impedance or through a separate communications systems, such as a separate inductive coupling, infrared communications, WiFi communications, Bluetooth communications or other communication schemes. The microcontroller 64 may follow essentially any of a wide variety of inductive power supply control algorithms. In some embodiments, the microcontroller 64 may vary one or more characteristics of the power applied to the coil 20 based on feedback from the portable device D. For example, the microcontroller 64 may adjust the resonant frequency of the tank circuit (e.g. the coil and capacitor combination), the operating frequency of the switching circuit 66, the rail voltage applied to the coil 20 or the duty cycle of the power applied to coil 20 to affect the efficiency or amount of power inductively transferred to the portable device D. A wide variety of techniques and apparatus are known for controlling operation of an inductive power supply. For example, the microcontroller may be programmed to operate in accordance with one of the control algorithms disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser.

No. 61/019,411, which is entitled "Inductive Power Supply with Duty Cycle Control" and filed on Jan. 7, 2008 by Baarman—all of which are incorporated herein by reference in their entirety.

Although the schematic shows only a single power outlet port 16, the number of power outlet ports 16 may be increased to the desired number. For example, to implement the power supply 10 of FIG. 3, the power supply 10 may include four power output ports 16.

For purposes of disclosure, FIG. 10 also shows a wireless electronic device D positioned adjacent to the power adapter 13. The wireless electronic device D generally includes a wireless power receiver 80, an AC/DC rectifier 70, a microcontroller 74, a battery 76 and a load 78. The wireless power receiver 80 of this embodiment may be a secondary coil 22. The secondary coil 22 is configured to inductively receive power from the primary coil 20 in the power supply 10. In the illustrated embodiment, the secondary coil 20 is a split-winding, spiral-wound coil of wire. The size, shape and configuration of the secondary coil 22 may be selected to correspond with the characteristics of the primary coil 20. Although the wireless power receiver 80 of this embodiment is a coil, the wireless device may include other forms of wireless power receivers. The secondary coil 22 is electrically coupled to the AC/DC rectifier 70. AC power generated in the secondary coil 22 passes into the rectifier 70 where it is converted to DC power. The rectifier 70 may be configured to scale the DC power to the appropriate level or the microcontroller 74 may include a DC/DC converter for adjusting the output of the rectifier 70 before applying it to the battery 76 or the load 78. The secondary microcontroller 74 may follow essentially any of a wide variety of inductive power supply control algorithms. In some embodiments, the secondary microcontroller 74 may send communications to the primary microcontroller 64 that permit the primary microcontroller 64 to vary one or more characteristics of the power applied to the coil 20. For example, the secondary microcontroller 74 may send communication signals indicative of the amount of power being received from the primary coil 20 or indicating whether more or less power is required. A wide variety of techniques and apparatus are known for controlling operation of an inductive power supply in the wireless electronic device. For example, the secondary microcontroller may be programmed to operate in accordance with one of the control algorithms disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689, 148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser. No. 61/019, 411, which is entitled "Inductive Power Supply with Duty Cycle Control" and filed on Jan. 7, 2008 by Baarman—all of which are incorporated herein by reference in their entirety.

Figure 11:
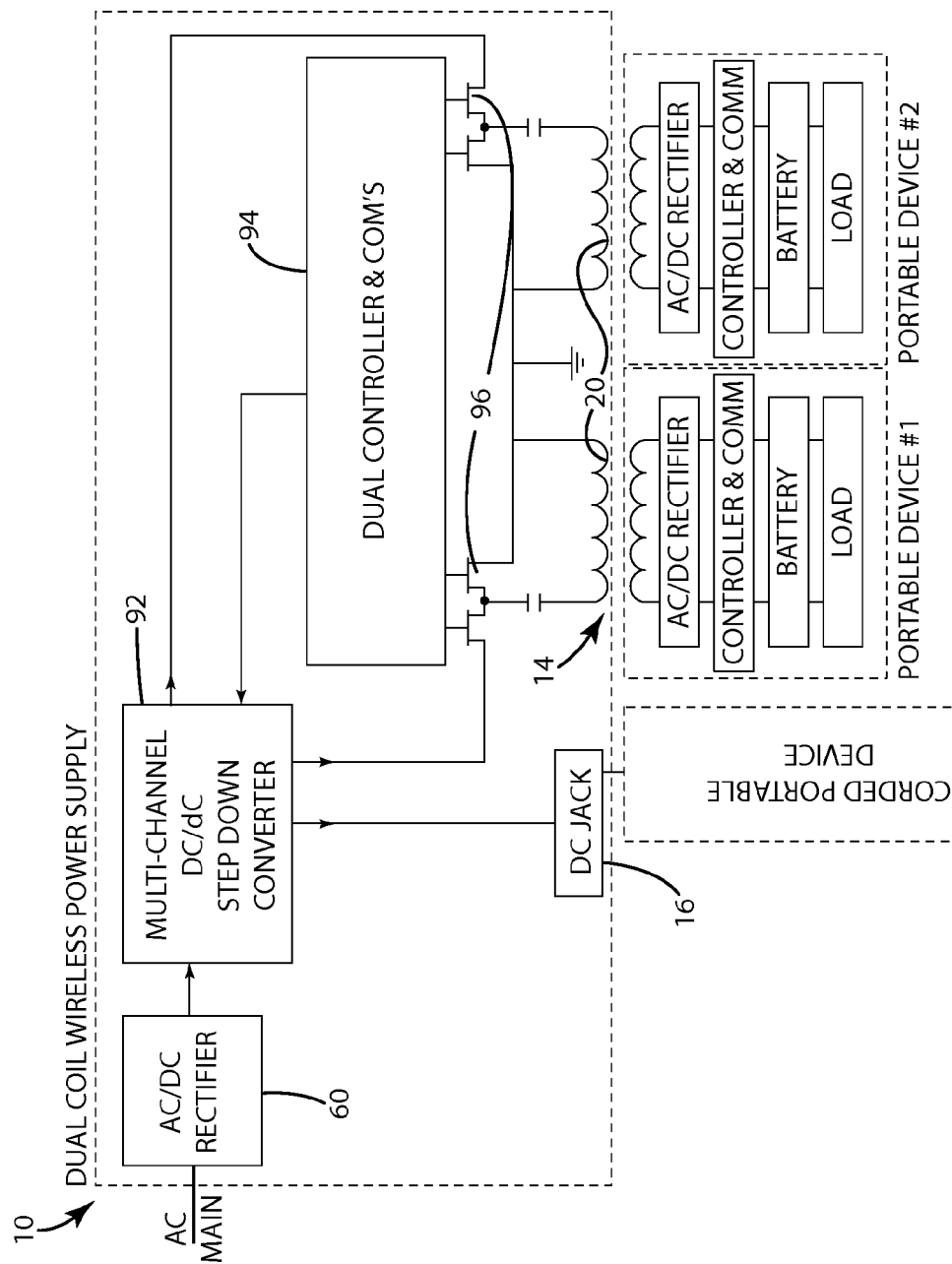
FIG. 11 is a schematic representation of a first alternative circuit for the power supply.

The circuitry may vary from application to application to provide power to the desired number of wireless power transmitters and power outlet ports. For example, FIG. 11 shows an alternative circuit in which the power supply 10 includes a single power output port 16 and a pair of integrated wireless power transmitters 14. In this embodiment, the power supply 10 includes a multi-channel DC/DC step down converter 92 that is capable of providing a variety of different DC power outputs. In the illustrated embodiment, the multi-channel converter 92 is capable of providing three different DC power outputs—one for the power output jack, one for the first primary coil and one for the second primary coil. In this embodiment, the microcontroller 94 controls operation of the switching circuits 96 and may also direct the multi-channel converter 92 to individually set the DC power level based on signals from the wireless device. For example, if the wireless device needs more power, it may send an appropriate signal to the microcontroller 94 and the microcontroller 94 may direct the multi-channel converter 92 to increase the DC power output to the corresponding switching circuit 96. On the other hand, if less power is required, the wireless device may send an appropriate signal to the microcontroller 94 and the microcontroller 94 may direct the multi-channel converter 92 to decrease the DC power output to the corresponding switching circuit 96.

Figure 12:
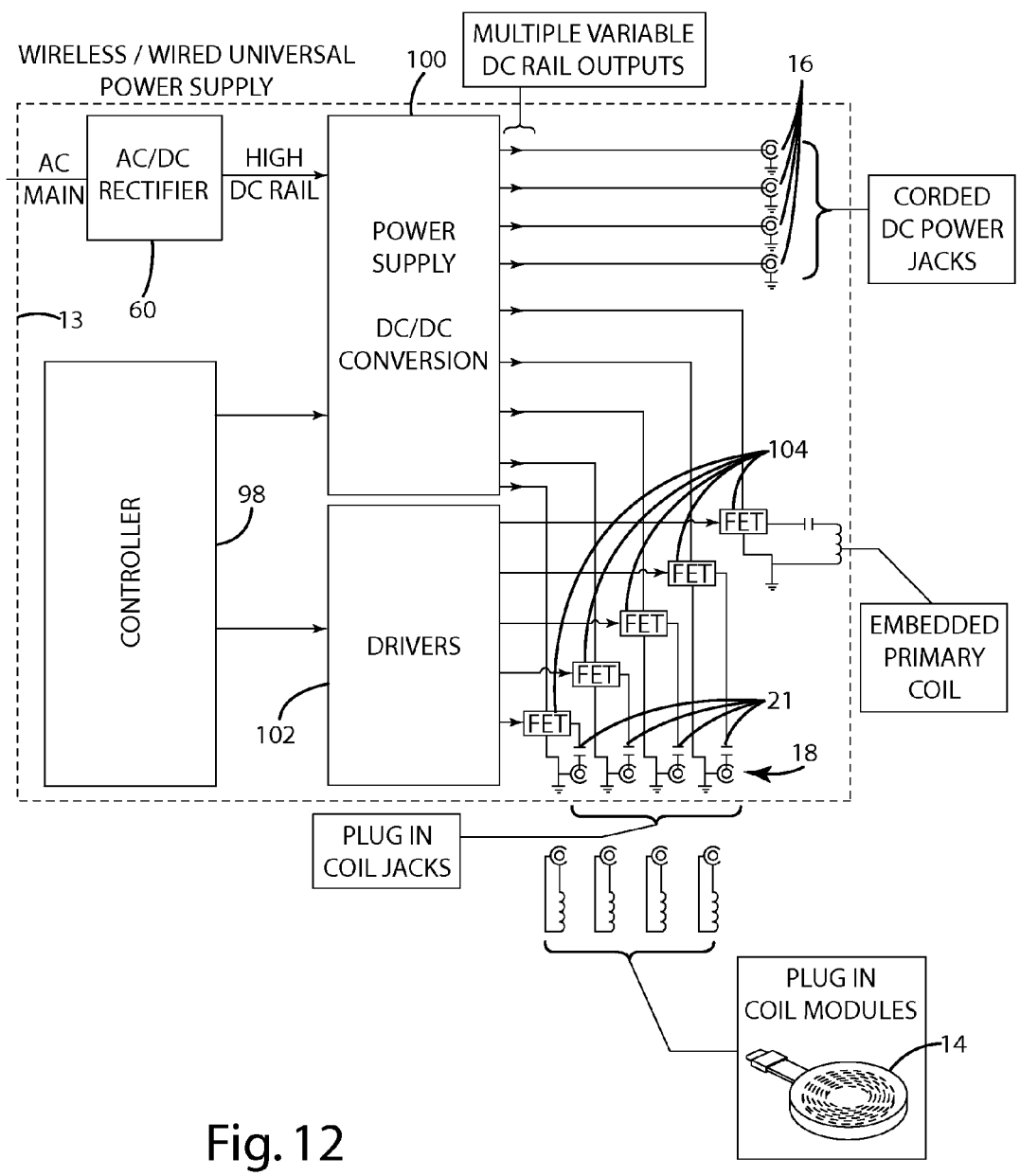
FIG. 12 is a schematic representation of a second alternative circuit for the power supply.

FIG. 12 shows a schematic diagram representing a circuit suitable for use with the power supply of FIG. 8. In this embodiment, the power supply 10 supplies power to one integrated wireless power transmitter 14, four power output ports 16 and four wireless power transmitter ports 18. As with the previously described embodiments, the circuit includes an AC/DC rectifier 60 for converting the AC power received from the AC mains into DC power, a multiple-channel DC/DC step down converter 100 for converting the DC output of the AC/DC rectifier 60 to a plurality of DC outputs, a microcontroller 98 for controlling operation of the power supply 10, a plurality of switching circuits 104 for controlling the application of power to the integrated and detachable wireless power transmitters 14 and a plurality of drivers 102 for controlling the timing of the switching circuits 104. The microcontroller 98 is programmed to control both the DC/DC converter and the drivers 102. With regard to the DC/DC converter, the microcontroller 98 may send control signals to the DC/DC converter 100 to individually dictate the levels of the different DC power outputs for the power outlet ports 16 and/or the wireless power transmitters 14. With this functionality, the microcontroller 98 can individually adjust the DC output of the power output ports 16 to accommodate a wider variety of wired electronic devices. The DC outputs for the wireless power transmitters 14 function as the rail voltage for the switching circuits 104. Accordingly, the microcontroller 98 can individually adjust the power output of the wireless power transmitters 14 by individually adjusting the DC outputs for the wireless power transmitters 14. In application where this functionality is not desired, the DC/DC converter output levels for the power output ports 16 and the wireless power transmitters 14 can be fixed. With regard to the drivers 102, the microcontroller 98 can adjust the timing of the drivers 102 to vary the timing of the switching circuits 104. This can, in turn, be used to adjust the operating frequency and/or duty cycle of the power applied to the wireless power transmitters 14. As noted above, the microcontroller 98 may operate the wireless power transmitters 14 in accordance with a wide variety of control schemes. For example, the microcontroller 98 may adjust the rail voltage of the power applied to the primary coil 20, the operating frequency of the wireless power transmitters or the duty cycle of the appropriate DC power level based on information relating to the power level desired by the wireless device and/or the efficiency of the inductive coupling with the wireless device. As another example, each wireless power transmitter 14 may be contained in a tank circuit (e.g. the subcircuit containing the coil 20 and the resonant capacitor 21 (which may be located in the power adapter 13 or one of the plug in coil modules or wireless transmitters 14), and the microcontroller may be configured to adjust the resonant frequency of the tank circuit to allow the tank circuit to operate efficiently through a broader range of operating frequencies. The microcontroller may adjust the resonant frequency of the tank circuit by adjusting the inductance and/or capacitance of the tank circuit. The inductance may be adjusted using a variable inductor or a bank of inductors that may be switched into or out of the tank circuit. Similarly, the capacitance may be adjusted using a variable capacitor or a bank of capacitors that may be switched into or out of the tank circuit.

In a second aspect, the present invention provides a power supply 510 that can be adapted to provide different wireless power supply configurations. In the embodiment shown in FIGS. 13 and 14, the power supply 510 includes two wireless power transmitters 514 located in different sections 512 of the power adapter 513. The two section 512 are joined to one another along a hinge 517 so that they may be pivoted to change the position and orientation of the two power transmitters with respect to one another. FIG. 13 shows the power adapter 13 being unfolded into a flat configuration that provides two side-by-side charging regions. FIG. 14 shows how two wireless electronic devices D can be placed on the two side-by-side power transmitters 514. In this embodiment, the power adapter 513 includes two housing sections 512. The power supply circuitry may be incorporated into one or both of the housing sections. In one embodiment, a single multi-channel circuit is provided for supplying power to both wireless power transmitters. In another embodiment, separate power supply circuits are provided for each wireless power transmitter. The hinge 517 is configured to allow the passage of electrical leads from one housing section 512 to the other housing section 512. For example, the bulk of the power supply circuitry may be located in one housing section 512 and electrical leads passing through the hinge 517 may deliver power to the primary coil 20 in the second housing section 512.

Figure 15:
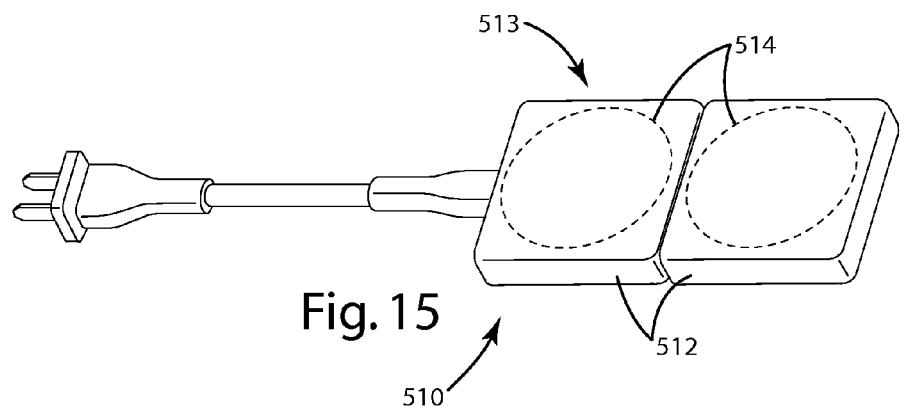
FIG. 15 is an illustration of an alternative power supply in accordance with the second aspect of the present invention.
Figure 16:
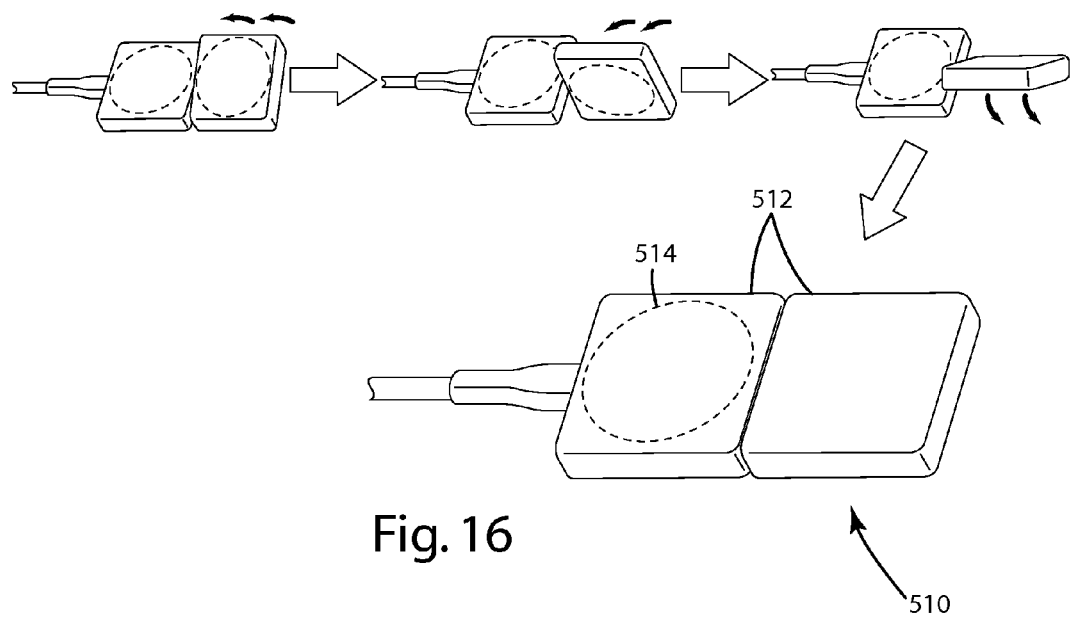
FIG. 16 is a series of illustrations showing movement of the second alternative embodiment between different configurations.

FIG. 15 shows a first alternative embodiment of the second aspect of the present invention. In this embodiment, power supply 510 includes two sections that are coupled together at a rotating joint. A separate wireless power transmitter 514 is located in each section 512. The two sections 512 can be rotated into different positions to vary the position and orientation of the two wireless power transmitters 514. For example, FIG. 16 includes a series of illustrations that show one of the two sections being increasingly rotated with respect to the other until the coil of one of the wireless power transmitters 514 is rotated 180 degrees. In the initial position, the power supply 510 can be used to wirelessly supply power to two adjacent wireless devices placed on top of the power adapter 513. In the rotated position, the power supply 510 can be used to wirelessly supply power to two wireless devices placed on opposite sides of the power adapter 513. Although a wide variety of connectors may be used to join the two sections 512. For example, in one embodiment, the connector may be generally tubular and may include a central bore for routing wiring from one section to the other. In an alternative embodiment, the connector 520 may create an electrical connection between the two sections 512, such as is the case with the connector illustrated in FIG. 17. As with the embodiment of FIG. 14, the power supply circuitry may be incorporated into one or both of the housing sections, and a single multi-channel power supply circuit or separate independent circuits may be use to supply power to the wireless power transmitters.

Figure 18A:
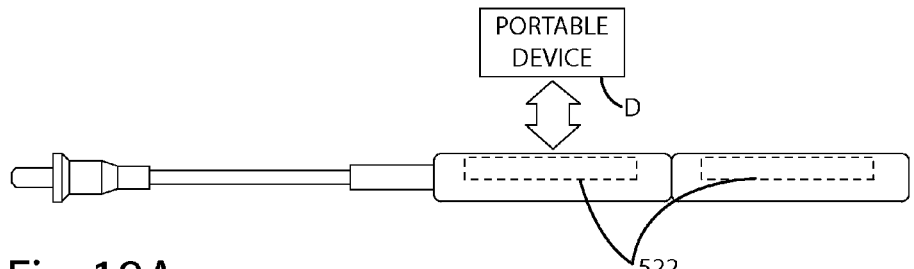
FIGS. 18A-E are illustrations showing various uses of the power supply of FIG. 15.
Figure 18B:
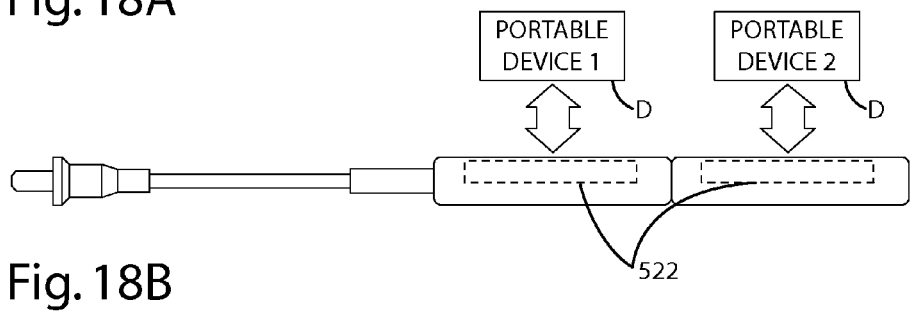
Figure 18C:
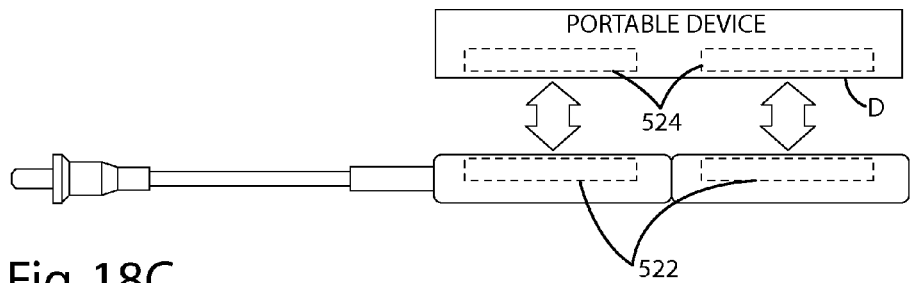
Figure 18D:
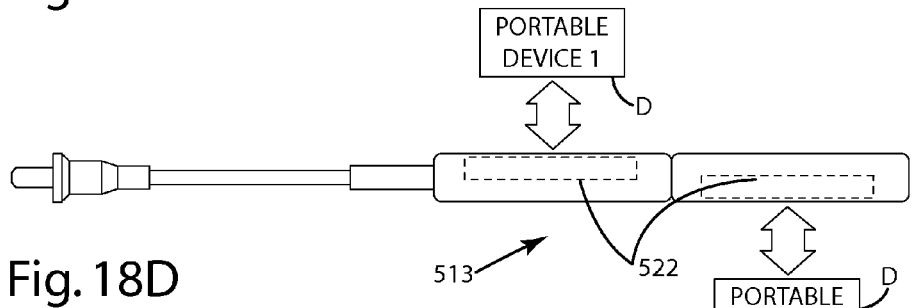
Figure 18E:
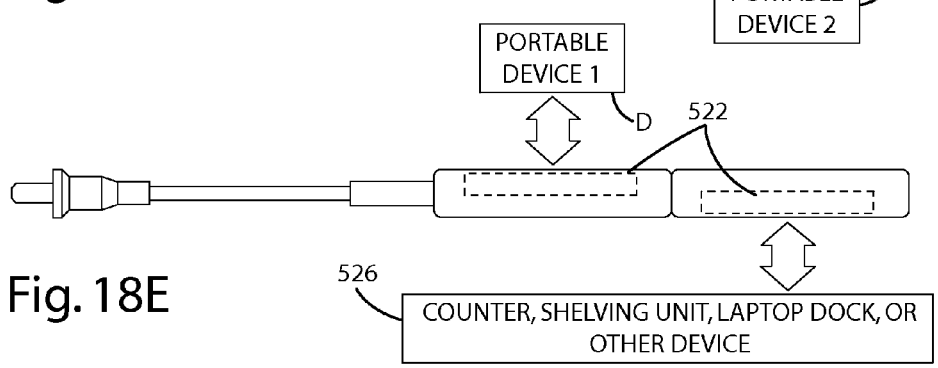

FIGS. 18A-E show various charging configurations of the power supply 10 of FIG. 15. FIG. 18A shows a single wireless device D placed over and receiving power from one of the two coils 522. FIG. 18B shows two wireless devices D—each placed over and receiving power from a separate coil 522. FIG. 18C shows a single wireless device D placed over and receiving power from both coils 522. In this embodiment, the wireless device D includes two secondary coils 524 so that the device D can simultaneously receive power from two primary coils 522. FIGS. 18D and 18E show the power supply 10 reconfigured with the two coils 522 on opposite sides of the power adapter 513. In FIG. 18D, separate wireless devices D are placed on opposite sides of the power adapter 513 to receive power from opposite coils 522. In FIG. 18E, the power adapter 513 is placed on a wireless-enabled surface 526. In this embodiment, a wireless device D may be placed over and receive power from the upward facing coil, while the downward facing coil 522 supplies power to a secondary coil mounted in the surface 526.

Figure 19:
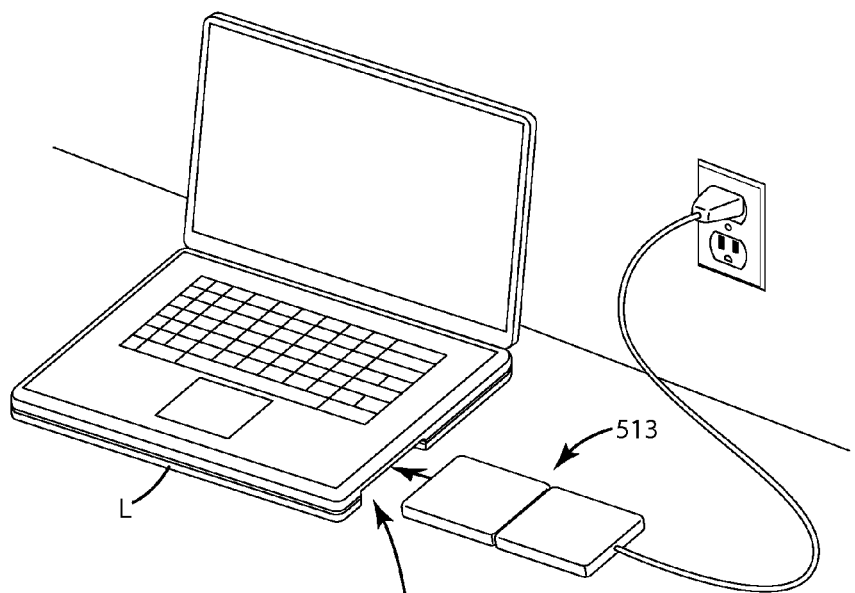
FIG. 19 is an illustration showing how the power supply of FIG. 15 may be used with a computer.
Figure 20:
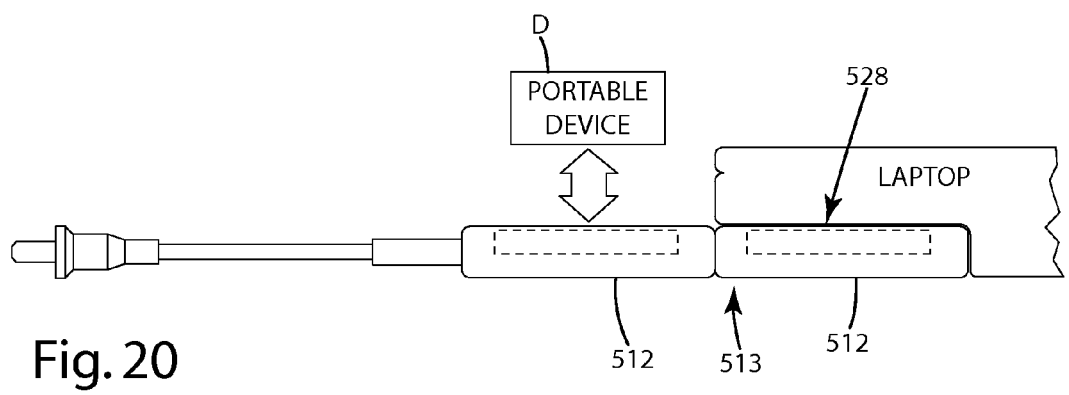
FIG. 20 is an illustration showing the power supply of FIG. 15 in place adjacent a computer.

Another potential application for the power supply 10 of FIG. 15 is shown in FIGS. 19 and 20. In this embodiment, a laptop computer L includes a power supply notch 528 configured to receive the outer section of the power adapter 513. As shown in FIG. 20, the power supply notch 528 may be sized and shaped to closely receive the outer section 512. In this embodiment, the inner section 512 can support and provide power to a wireless device D.

Figure 21:
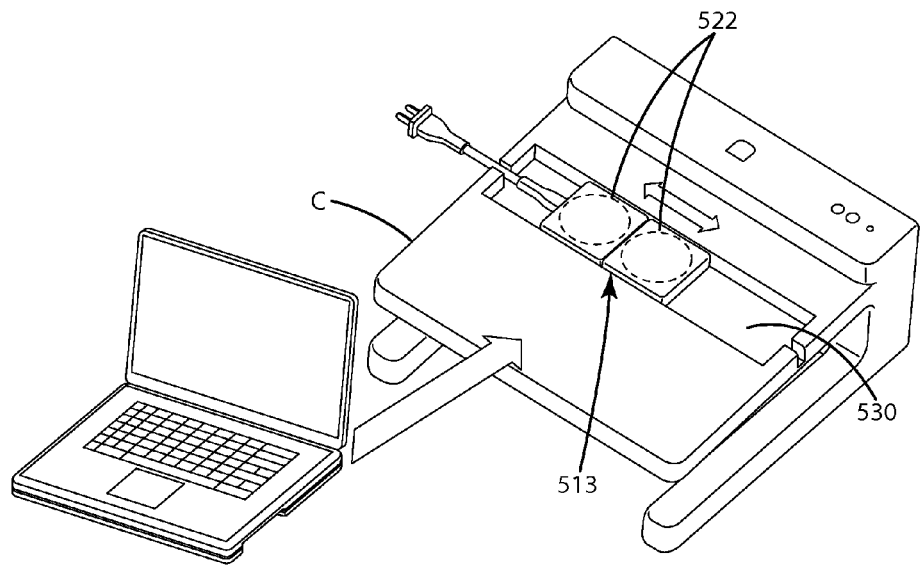
FIG. 21 is an illustration showing the power supply of FIG. 15 incorporated into a computer dock.

FIG. 21 shows a wireless computer dock C configured to receive the wireless power supply 510 of FIG. 15. In this embodiment, the computer support surface defines a channel 530 adapted to receive the power adapter 513. The channel 530 may be longer than the adapter 513 so that the adapter 513 can be slid along the channel to vary the position of the coils 522 beneath the laptop L. In this embodiment, the laptop L may include two secondary coils (not shown) to receive power from both primary coils 522. Alternatively, the power adapter 13 may be positioned so that one coil is beneath the laptop L and the other extend past the edge of the laptop L to potentially provide power to another wireless device (not shown).

Figure 22:
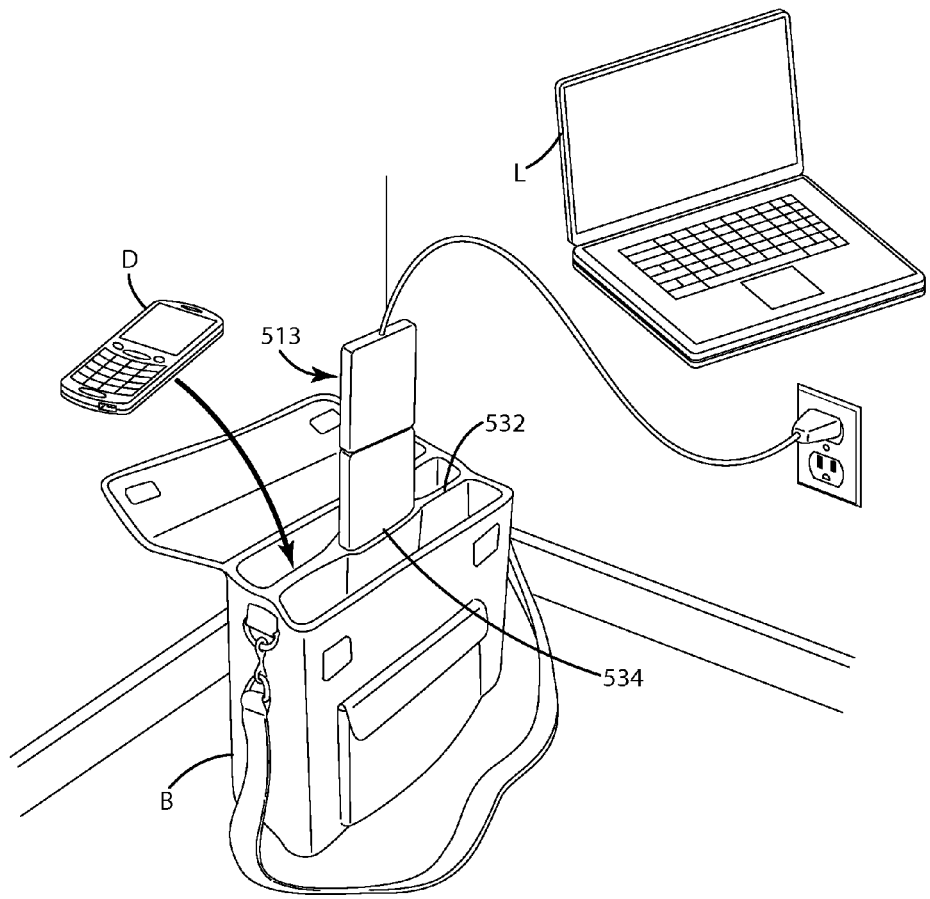
FIG. 22 is an illustration showing the power supply of FIG. 15 incorporated into a computer bag.

FIG. 22 shows a computer bag B configured to receive the wireless power supply 10 of FIG. 15. In this embodiment, the computer bag B includes a central flap 532 with a pocket 534 to receive the power adapter 513. The power supply 510 may be configured so that the primary coils face in the same or opposite directions. In the current embodiment, the pocket 534 is positioned to hold the power adapter 513 in a position where it can supply power to a laptop L placed on one side of the flap 532 and to a wireless device D placed on the other side of the flap 532. In alternative embodiments, the pocket may be placed elsewhere in the bag. For example, the pocket may be oriented horizontally and located in one of the bag walls. In such an embodiment, the middle flap of the bag may be eliminated.

Figure 17:
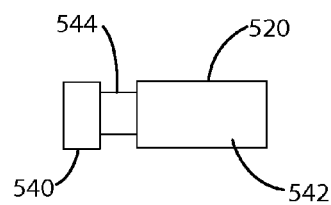
FIG. 17 is end and side views of a connector for joining power adapter sections.
Figure 23:
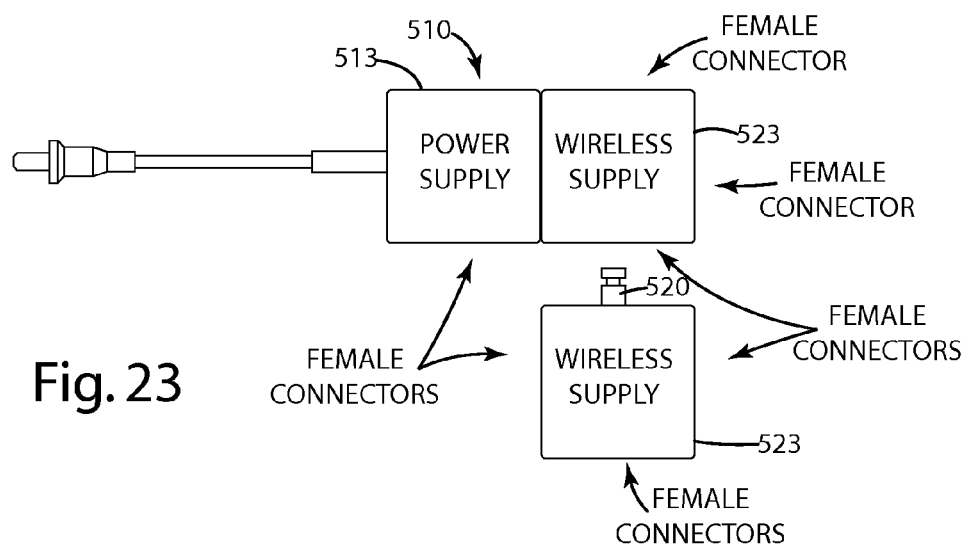
FIG. 23 is an illustration of a third alternative power supply in accordance with the second aspect of the present invention.

FIG. 23 shows an alternative power supply 510 in which multiple wireless power transmitters 514 maybe attached to a single power supply. In this embodiment, the principle circuitry of the power supply 510 is contained in the power adapter 513. The wireless power transmitters 514 are provided in modules 514 that can be added to the power adapter 513 as desired. For example, as shown in FIG. 23, each module 513 may include a male connector 520 and one or more female connectors (not shown). The male and female connectors may be positioned as desired. For example, each module 514 may include a male connector 520 extending from the center of one side and three female connectors centered on the other three sides. In this embodiment, the male connector 520 allows a module 514 to be secured to the power adapter 513 or to another module 514. The modules 514 may be daisy-chained to build almost any arrangement of primary coils. Although a wide variety of connectors maybe used to join the modules 514, FIG. 17 shows end and side views of one potential male connector for joining adjacent modules. In this embodiment, the connector 514 is a two conductor connector in which an upper contact 540 and a lower contact 542 are separated by an insulator 544. Although not shown, the female connector includes two contacts that separately engage the upper contact 540 and the lower contact 542. A snap-fit catch, such as a spring-loaded bearing, may be used to secure the male connector with the female connector. The bearing is configured to snap fit into the channel around the insulator when the male connector is fitted properly into the female connector. The bearing may be manufactured from a non-conductive material to so that it does not create a short circuit between the upper contact and the lower contact.

Figure 24:
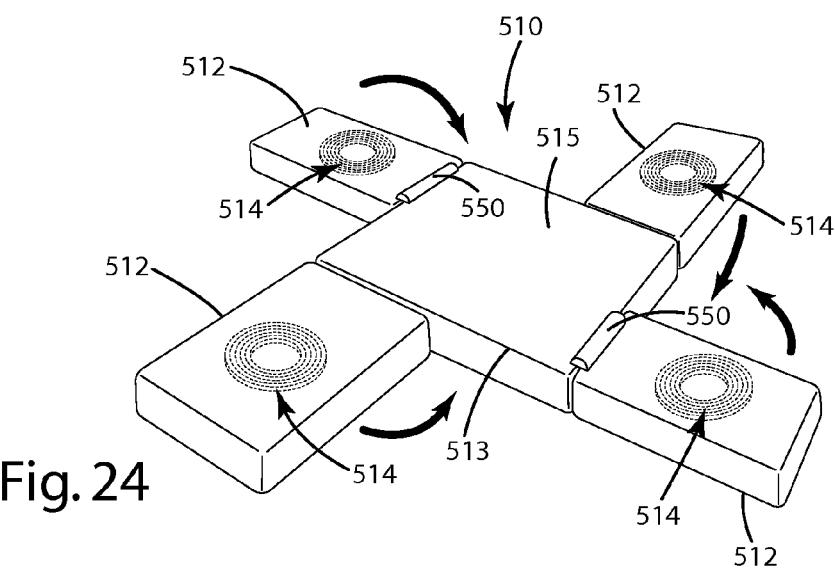
FIG. 24 is an illustration of a fourth alternative power supply in accordance with the second aspect of the present invention.
Figure 25:
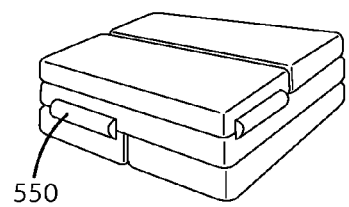
FIG. 25 is an illustration showing the power supply of FIG. 24 in a folded configuration.

Another embodiment of a power supply in accordance with a second aspect of the present invention is shown in FIGS. 24 and 25. In this embodiment, the power supply 510 includes a power adapter 513 with a plurality of folding arms that contain the wireless power transmitters 514. As shown, the power adapter 513 may include a central section 515 that contains the bulk of the power supply circuitry (not shown). Four folding sections 512 may be hingedly coupled to the central section 515 using hinges 550. In this embodiment, two folding sections 512 may be foldable onto the top surface of the central section 515 and two folding sections 552 may be foldable under the bottom surface of the central section (See FIG. 25). In the illustrated embodiment, a separate wireless power transmitter 514 (e.g. a primary coil) is disposed within each folding section 512. The folding sections 512 may be unfolded to provide a relatively large charging arrangement or folded to provide compact storage.

Figure 26:
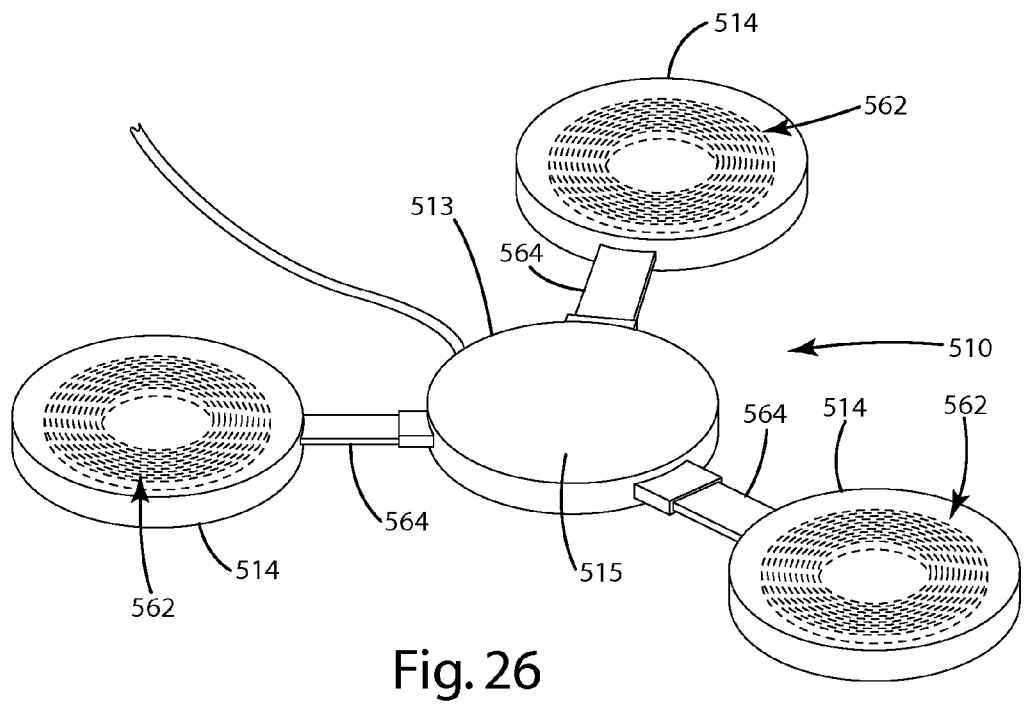
FIG. 26 is an illustration of a fifth alternative power supply in accordance with the second aspect of the present invention.
Figure 27:
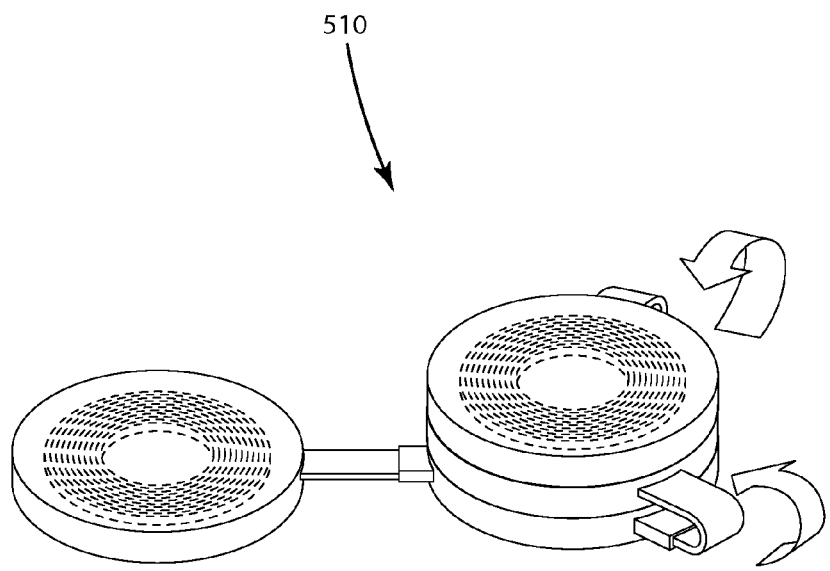
FIG. 27 is an illustration showing the power supply of FIG. 26 in a folded configuration.

FIGS. 26 and 27 show another embodiment of a power supply in accordance with a second aspect of the present invention. In this embodiment, the power supply 510 includes a power adapter 513 with a plurality of folding arms that contain the wireless power transmitters 514. As shown, the power adapter 513 may include a central section 515 that contains the bulk of the power supply circuitry (not shown). Three coil assemblies 562 may be coupled to the central section 515 by flexible connector sections 564. All three coil assemblies 562 may be foldable onto the top surface of the central section 515 in a stacked configuration (See FIG. 27, which shows two of the three coil assemblies folded onto the central section 515). If desired, a magnet (not shown) may be disposed within each coil assembly 562. The magnets may help align the coils when a wireless device is place over a coil assembly. Plus, the magnets may help to hold the coil assemblies 562 in the stacked configuration. The coil assemblies 562 may be fixedly coupled to the central section or they may be detachably coupled using the plugs and ports as described in previously described embodiments.

Figure 29:
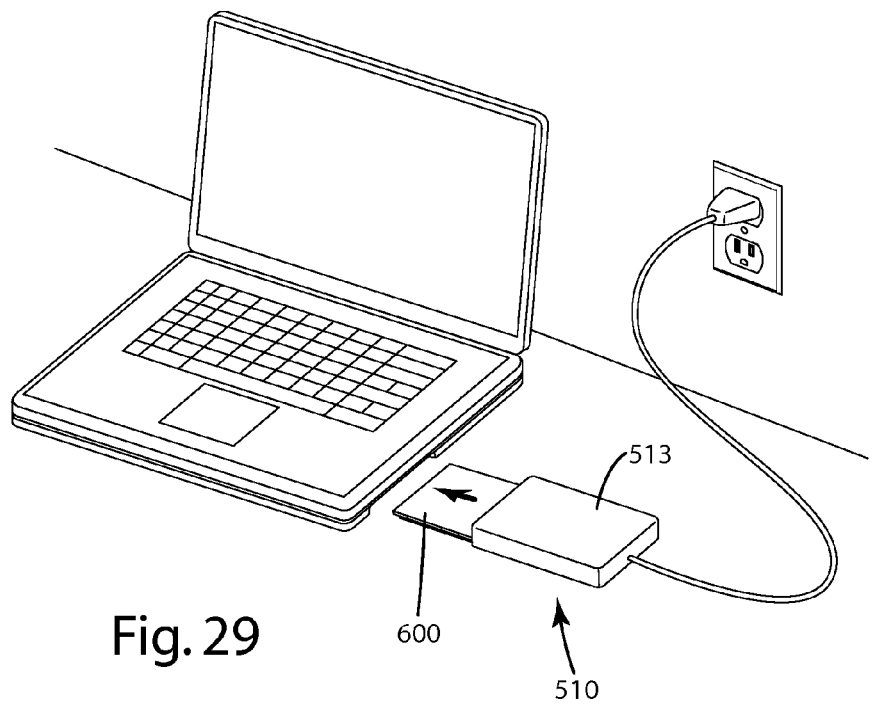
FIG. 29 is an illustration of a power brick with an extended panel wireless power transmitter being positioned to power a laptop.
Figure 30:
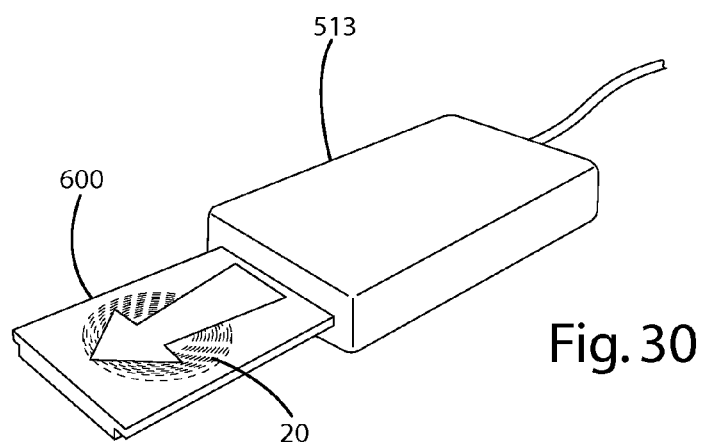
FIG. 30 is an illustration of the power brick with extendable panel of FIG. 29.

FIGS. 29 and 30 show another embodiment of a power supply in accordance with a second aspect of the present invention. In this embodiment, the power supply 510 includes a power adapter 513 with a thin panel that slides out to fit under a laptop L. The thin panel 600 includes a coil 20. In one embodiment, the coil 20 is a spiral-round coil of Litz wire. The size, shape and configuration of the coil 20 may vary from application to application depending in part on the amount of power to be transmitted. For example, the diameter of the coil 20, the number of turns of wire in the coil 20 and the size of the wire used to form the coil 20 may vary based on the specific application. If desired, the panel 600 may include a magnet 26. The panel could include essentially any or all of the power supply circuitry. Alternatively, some or all of the power supply circuitry could be included in the power adapter 513, except for coil 20. In one embodiment, a coil assembly, as described in previous embodiments, is included in the panel and power supply circuitry is included in the power adapter. The panel 600 may be contoured to correspond in shape with the intended wireless device. In the current embodiment, the panel presents a thin structure capable of fitting under a slot provided in the Laptop L. This may assist in providing close alignment between the primary coil 20 and the secondary coil 22, and may help to retain the laptop L in place on the coil 20. The panel may be selectably retractable from the power adapter 513 so that when the coil is not in use the panel may be placed in a retractable position. In some embodiments, the panel may be locked in the retractable position. In its retracted position, the power adapter 513 of the current embodiment is similar to the FIG. 3 embodiment. Although not illustrated, in alternative embodiments, wired power connectors could be included in the power adaptor. There may be an electrical connection between the power adapter and the power circuitry in the panel that is maintained when the panel is extended or retracted. For example, there may be sufficient slack in a wire so that when the panel is extended the electrical connection between the coil or power supply circuitry in the panel is maintained with the power supply circuitry in the power adapter. In one embodiment, the wall cord itself has sufficient slack to maintain electrical connection directly to the power supply circuitry in the panel.

Figure 31:
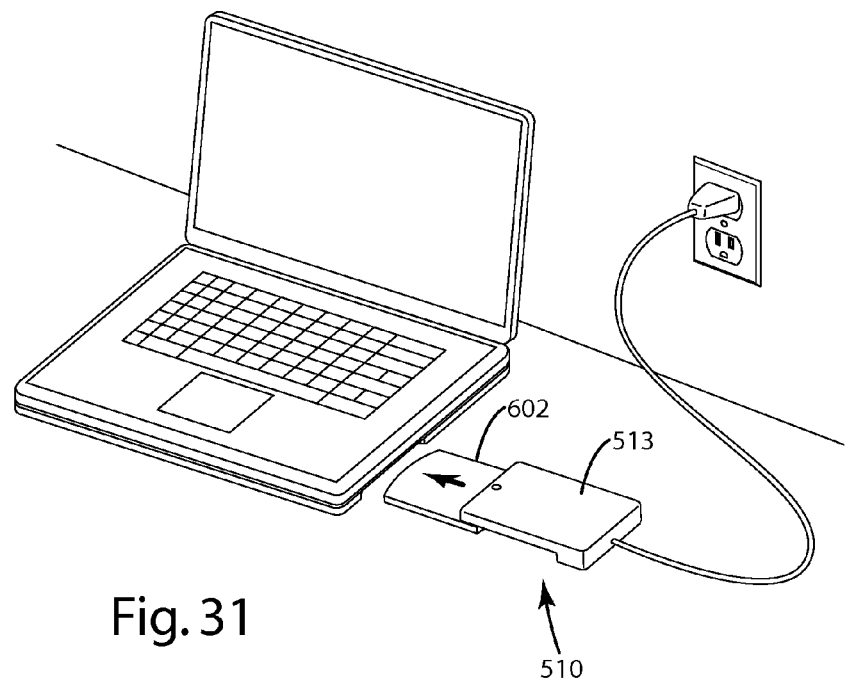
FIG. 31 is an illustration of a power brick with a rotatable panel wireless power transmitter being positioned to power a laptop.
Figure 32:
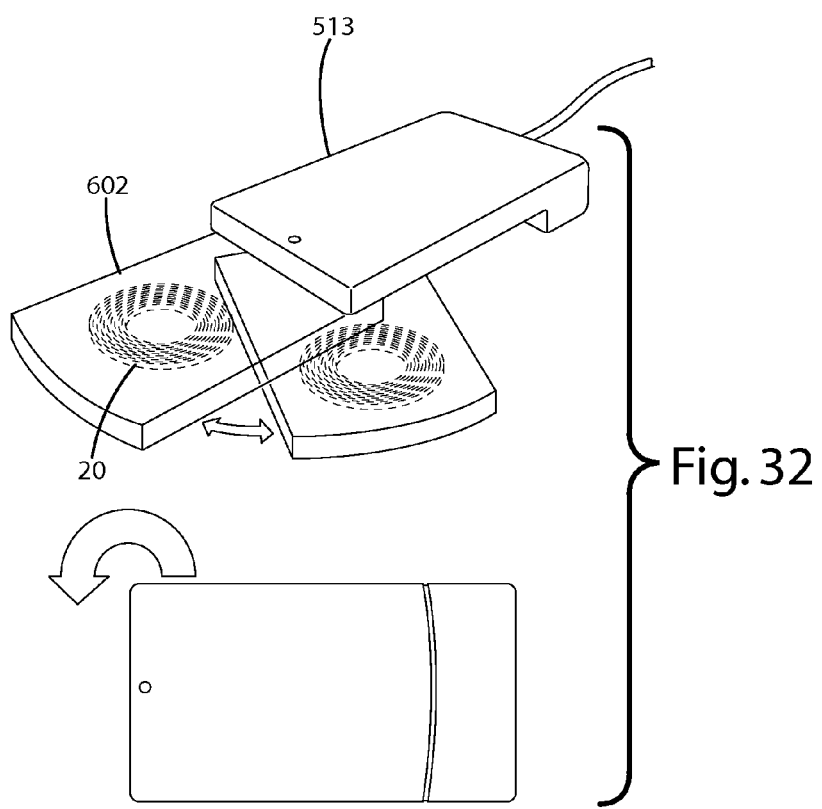
FIG. 32 is an illustration of a perspective and bottom view of the power brick of FIG. 31.

FIGS. 31 and 32 show yet another embodiment of a power supply in accordance with a second aspect of the present invention. In this embodiment, the power supply 510 includes a power adapter 513 with a thin panel 602 that rotates or fans out to an extension position. Just as in the retractable panel embodiment, the panel 602 includes a coil 20. In one embodiment, the coil 20 is a spiral-round coil of Litz wire. The size, shape and configuration of the coil 20 may vary from application to application depending in part on the amount of power to be transmitted. For example, the diameter of the coil 20, the number of turns of wire in the coil 20 and the size of the wire used to form the coil 20 may vary based on the specific application. If desired, the panel 602 may include a magnet 26. The panel 600 may be contoured to correspond in shape with the intended wireless device. In the current embodiment, the panel presents a thin structure capable of fitting under a slot provided in the Laptop L. The panel may be selectably rotatable between a variety of different positions. In one position, the panel may be locked in a home position where the power adapter 513 of the current embodiment is configured similarly to the FIG. 3 embodiment. Although not illustrated, in alternative embodiments, wired power connectors could be included in the power adapter. As with the retractable embodiment, any combination of power supply circuitry may be included in the panel and or adapter. Further, there may be an electrical connection between the power adapter and the panel that is maintained when the panel is extended or retracted. For example, there may be sufficient slack in a wire between the panel and the power adapter so that when the panel is extended the electrical connection between the coil or power supply circuitry in the panel is maintained with the power supply circuitry in the power adapter. In one embodiment, the wall cord itself has sufficient slack to maintain electrical connection directly to the power supply circuitry in the panel.

Figure 28:
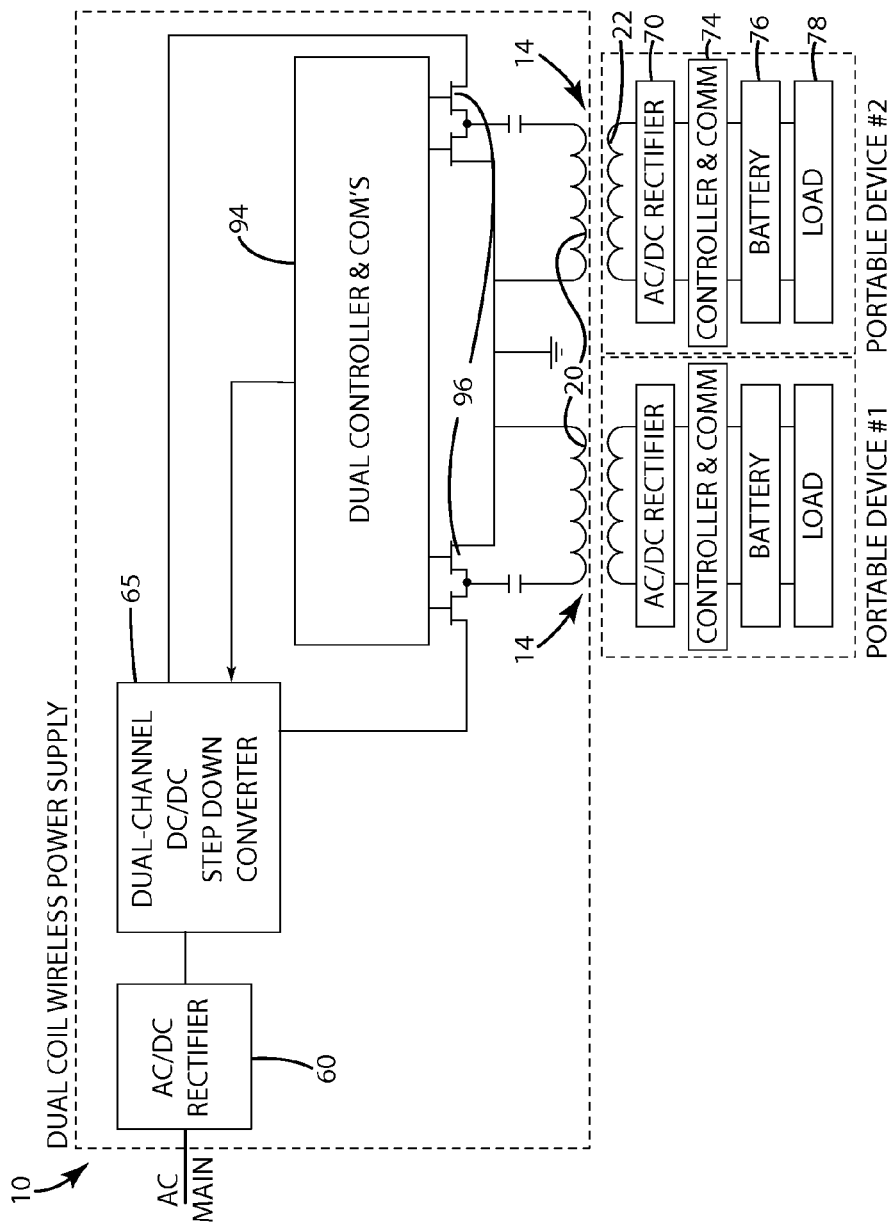
FIG. 28 is a schematic representation of a circuit for a power supply in accordance with a second aspect of the present invention.

The circuitry of the power supply 10 may vary from application to application. A wide variety of circuits and circuit components suitable for wirelessly supplying power from the power supply to a wireless device D are known to those skilled in the art. For purposes of disclosure, and not by way of limitation, one suitable circuit is described in connection with FIG. 28. FIG. 28 is a schematic of a power supply circuit for wirelessly supplying power to two separate wireless power transmitters 14. In this embodiment, the wireless power transmitters are primary coils 20 configured to generate an electromagnetic field in response to the application of a varying supply of power. The power supply circuitry generally includes an AC/DC rectifier 60 for converting the AC power received from the AC mains into DC power. The power supply 10 also includes a dual-channel DC/DC step down converter 65 for converting the DC output of the AC/DC rectifier 60 to the desired level. The dual-channel DC/DC converter 62 has the ability to provide two DC outputs at different power levels. The power supply 10 also includes a dual microcontroller 94 and a pair of switching circuits 96. The dual microcontroller 94 is capable of separately operating each pair of switching circuits 96 so that the power supplied by the two primary coils 20 can be independently adapted to the corresponding wireless device D. The dual microcontroller 94 is programmed to send control signals to the dual-channel DC/DC converter to set the power level of the DC outputs. The dual microcontroller is also programmed to control the two switching circuits 96 to generate the appropriate AC power for the two coils 20. For example, the dual microcontroller can control the timing of the switches to vary the operating frequency and/or duty cycle of the signals applied to the two primary coils. As with previously described embodiment of the power supply circuit, the dual microcontroller 94 of this embodiment may follow essentially any of a wide variety of inductive power supply control algorithms. In some embodiments, the dual microcontroller 94 may vary one or more characteristics of the power applied to a coil 20 based on feedback from the corresponding portable device D. For example, the dual microcontroller 94 may adjust resonant frequency, operating frequency, rail voltage or duty cycle to affect the efficiency or amount of power inductively transferred to the corresponding portable device D. A wide variety of techniques and apparatus are known for controlling operation of an inductive power supply. For example, the dual microcontroller may be programmed to operate in accordance with one of the control algorithms disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety. Although the embodiment of FIG. 28 includes a dual microcontroller, the dual microcontroller may be replaced by separate microcontrollers for each wireless power transmitter.

FIG. 28 also shows schematic representations of the circuitry in a pair of wireless electronic devices D. As shown, each device D is positioned adjacent to a different primary coil 20. In this embodiment, the circuits of the two devices D are essentially identical. Accordingly, only one will be described in detail. The wireless electronic devices D generally include a wireless power receiver 22, an AC/DC rectifier 70, a microcontroller 74, a battery 76 and a load 78. The wireless power receiver 22 of this embodiment may be a secondary coil 22. The secondary coil 22 is configured to inductively receive power from the primary coil 20 in the power supply 10. The size, shape and configuration of the secondary coil 22 may be selected to correspond with the characteristics of the primary coil 20. Although the wireless power receiver 22 of this embodiment is a coil, the wireless device may include other forms of wireless power receivers. The secondary coil 22 is electrically coupled to the AC/DC rectifier 70. AC power generated in the secondary coil 22 passes into the rectifier 70 where it is converted to DC power. The rectifier 70 may be configured to scale the DC power to the appropriate level or the microcontroller 74 may include a DC/DC converter for adjusting the output of the rectifier 70 before applying it to the battery 76 or the load 78. The secondary microcontroller 74 may follow essentially any of a wide variety of inductive power supply control algorithms. In some embodiments, the secondary microcontroller 74 may send communications to the primary microcontroller 94 that permit the primary microcontroller 94 to vary one or more characteristics of the power applied to the coil 20. For example, the secondary microcontroller 74 may send communication signals indicative of the amount of power being received from the primary coil 20 or indicating whether more or less power is required. A wide variety of techniques and apparatus are known for controlling operation of an inductive power supply in the wireless electronic device. For example, the secondary microcontroller may be programmed to operate in accordance with one of the control algorithms disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety.

Although not shown, power supplies in accordance with a second aspect of the present invention may include power outlet ports for providing power to wired electronic devices WD. For example, the power supplies of FIGS. 13-27 may be modified to include power outlet ports. The number, location and specifications of the power outlet ports may vary from application to application.

Figure 33:
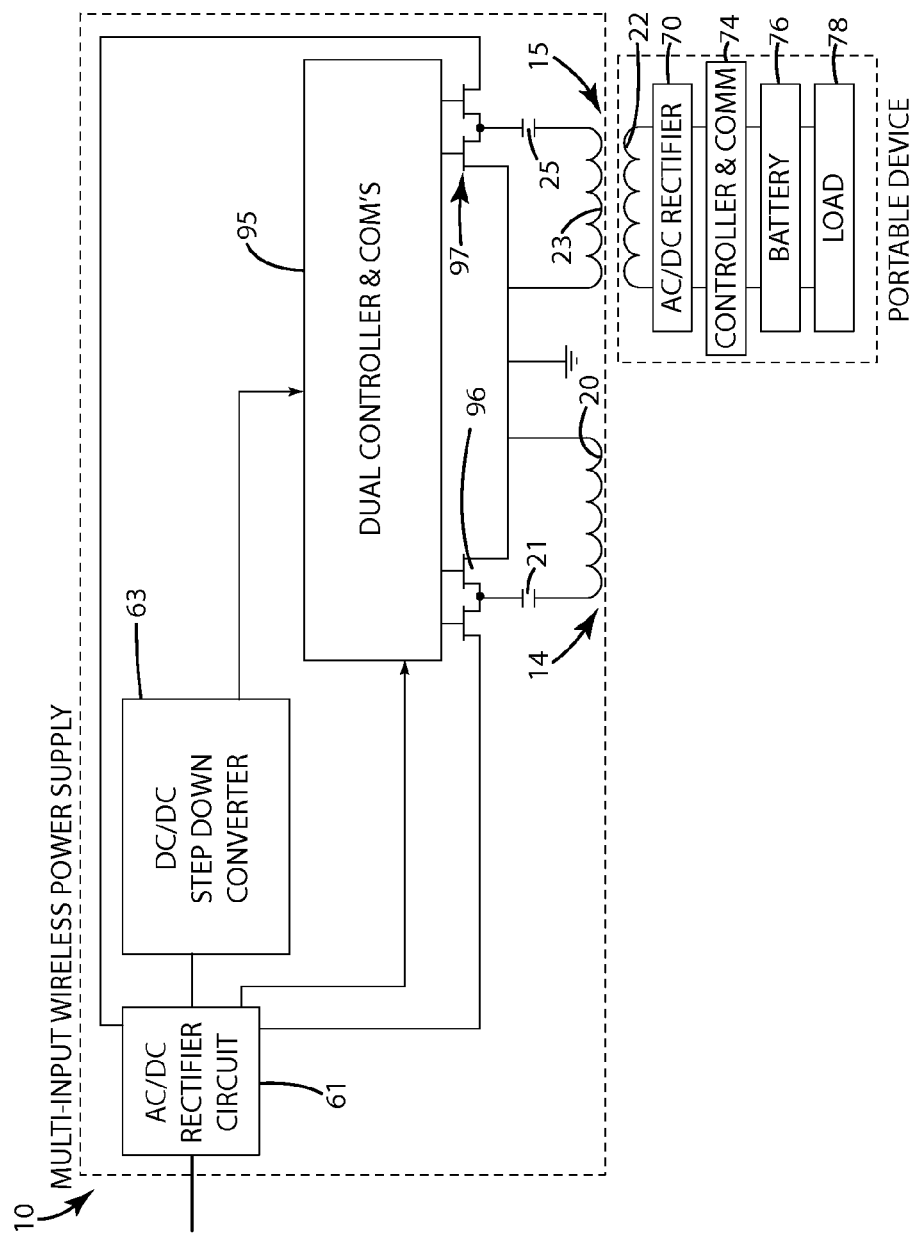
FIG. 33 is a schematic representation of a circuit for a multi-input wireless power supply.

Referring to FIG. 33, one embodiment of a multi-input wireless power supply 10. The depicted embodiment includes an AC/DC rectifier circuit 61 capable of accepting a first input voltage or a second input voltage. In alternative embodiments, the AC/DC rectifier circuit 61 may be capable of accepting additional input voltages. The input voltages can be DC or AC. The input voltages can be a variety of different levels. For example, in the depicted embodiment, the AC/DC rectifier can accept 110VAC or 220VAC. In alternative embodiments, the AC/DC rectifier might accept 110VAC, 220VAC, 19VDC, or 5VDC. The AC/DC rectifier produces a rectified output. Where a DC input voltage is supplied, the rectifier has little to no effect on the signal, but a rectified DC output is still provided.

In addition to the AC/DC rectifier 61, in the current embodiment a low power DC/DC step down converter 63 is provided in order to supply power to a microcontroller. The size of the DC/DC step down converter is kept small because only a small amount of power is needed in order to power a microcontroller, typically only a few microwatts. It may be possible in some embodiments to eliminate the DC/DC converter if the circuit does not require a small DC power source, for example if the microcontroller is powered by a battery or if the circuit is designed with analog components instead of a microcontroller.

The multi-input wireless power supply also includes a sensor for detecting which of the first input voltage and the second input voltage is connected to the multi-input wireless power supply. In the current embodiment, the sensor is included in the AC/DC rectifier circuit. In alternative constructions, the sensor may be a separate component or may be integrated into the microcontroller or another component. In embodiments with more than two input voltages, the sensor may be capable of determining which input voltage of a plurality of different input voltages is connected. In the current embodiment, the sensor is a voltage sensor, but in alternative constructions a current sensor, or another type of sensor that can reliably indicate which source voltage is connected to the wireless power supply could be used. In the current embodiment, the rectified voltage is being sensed in the AC/DC rectifier circuit, in alternative embodiments, the pre-rectified voltage may be sensed, of course the programming in the controller would need to be modified accordingly.

The multi-input wireless power supply also includes a plurality of switching circuits 96, 97 each coupled to the rectified output from the AC/DC rectifier. That is, the output from the rectifier circuit 61 is coupled directly to the switching circuit 96, 97 without first being stepped down with a step down converter. In the current embodiment, the switching circuits are rated for whichever of the first input voltage and the second input voltage is higher. In embodiments capable of accepting more than two different input voltages, the switching circuits may be rated for the highest input voltage. In systems that can accept multiple input voltages instead of having all switches be rated for the highest input voltage, there may be a single switch rated for the highest input voltage and additional switching circuits that are only capable of being in the electrical path once the microcontroller has determined that the input voltage is below the rating of that switching circuit.

The current embodiment of the multi-input wireless power supply also includes two tank circuits or wireless power transmitters 14, 15. Alternative embodiments may include additional tank circuits. Each tank circuit is designed to provide wireless power to a remote device where the tank circuit components are selected based at least as a function of the amount of DC voltage that is being provided to the switching circuit associated with that tank circuit. For example, if the tank circuit is to receive 165VDC (that is 110VAC, rectified), the characteristics of the inductor 20 and capacitor 21 in the tank circuit 14 are selected such that an appropriate amount of power will be transmitted to a remote device placed proximate to the tank circuit. Different tank circuit components are used for different input voltages. That is, the tank circuit components for different input voltages such as 19VDC, 5VDC, or 308VDC (220VAC, rectified) are all selected/designed separately in order to provide a target amount of power to the remote device. In the current embodiment, the first tank circuit 14 is coupled to one of the plurality of the switching circuits 96. A second tank circuit 15 is coupled to a different one of the plurality of the switching circuits 97. The characteristics of the second tank circuit are selected for transferring power to the remote device as a function of the second input voltage. That is, the shape, size, and characteristics of the inductor 23 and the capacitor 25 in the tank circuit are selected based on the second input voltage, just as the shape, size, and characteristics of the inductor 20 and capacitor 21 of the first tank circuit 14 were selected based on the first input voltage. In the current embodiment, the characteristics of the second tank circuit 14 are different from the characteristics of the first tank circuit 15. In the depicted embodiment, both tank circuits are designed to accept a high DC rail voltage that has not been stepped down by a DC/DC converter. One advantage of the current embodiment is that a relatively bulky DC/DC converter is unnecessary and may be eliminated from the circuit design.

In addition, the multi-input wireless power supply may be designed to provide different amounts of wireless power. In some embodiments, the multi-input wireless power supply may be dynamic and adjust the amount of power to be provided to the remote device based on operating frequency adjustment of the switching circuit, duty cycle adjustment of the switching circuit, rail voltage adjustment, or any other characteristic that may affect the amount of power to be transferred. A number of these techniques are discussed in the references previously incorporated by reference and mentioned above.

The multi-input wireless power supply may also include a microcontroller 95 coupled to the low power DC/DC converter and the switching circuits. The microcontroller is programmed to control the plurality of switching circuits based on output from the sensor, which indicates which input source is connected. In the most simple embodiment, the rectified voltage is provided to all of the switching circuits, but only the switching circuit coupled to the tank circuit designed for that particular input voltage (or input voltage range) is operated. In other embodiments, the AC/DC rectifier circuit may include a switch or multiplexer so that the rectified voltage is only provided to the DC/DC step down converter and the appropriate switching circuit. In some embodiments, it may be possible to include an array of tank circuits/switching circuits for each potential input voltage or input voltage range.

Instead of a multi-input wireless power supply that has the ability to operate with multiple inputs, a single input high DC rail wireless power supply may be designed such that it produces an electromagnetic field similar to the electromagnetic filed produced by a single input low DC rail wireless power supply. That is, a single input wireless power supply may be designed without a high power DC/DC converter so that the DC rectified voltage is used by a switching circuit to generate an AC signal across a tank circuit specifically designed to produce an electromagnetic field similar to the filed that would be produced by a wireless power supply that uses a low DC rail voltage to generate an electromagnetic field.

In particular, in one embodiment of the present invention, a method for designing a high DC rail wireless power supply is provided. The method includes providing a low DC rail wireless power supply including an AC/DC rectifier for generating a high DC rail voltage, a DC/DC converter for stepping down the high DC rail voltage into a low DC rail voltage. Providing a switching circuit for switching the low DC rail voltage to generate an AC signal and providing a tank circuit coupled to the AC signal for generating an electromagnetic field. The method includes selecting components based on the low DC rail wireless power supply. In particular, the method includes selecting an AC/DC rectifier for generating a high DC rail voltage, selecting a switching circuit rated for switching the high DC rail voltage, selecting a tank circuit having characteristics for generating an electromagnetic field similar to the electromagnetic field produced by the low DC rail wireless power supply in response to the high DC rail voltage.

The above description is that of current embodiments of the invention. Various alterations and changes can be made without departing from the spirit and broader aspects of the invention.

The invention claimed is:

1. A multi-input wireless power supply comprising:
    an AC/DC rectifier circuit capable of accepting a first input voltage or a second input voltage, wherein said AC/DC rectifier produces a rectified output;
    a sensor for detecting which of said first input voltage and said second input voltage is connected to said multi-input wireless power supply;
    a plurality of switching circuits each coupled to said rectified output;
    a first tank circuit coupled to one of said plurality of switching circuits, wherein characteristics of said first tank circuit are selected for transferring power to a remote device as a function of said first input voltage;
    a second tank circuit coupled to a different of said plurality of switching circuits, wherein characteristics of said second tank circuit are selected for transferring power to said remote device as a function of said second input voltage, wherein said characteristics of said second tank circuit are different from said characteristics of said first tank circuit;
    a low power DC/DC converter coupled to said AC/DC rectifier for converting said rectified output;
    a microcontroller coupled to said low power DC/DC converter, wherein said microcontroller is programmed to control said plurality of switching circuits based on output from said sensor.

2. The multi-input wireless power supply of claim 1 wherein said plurality of switching circuits are rated for whichever of said first input voltage and said second input voltage is higher.

3. The multi-input wireless power supply of claim 1 wherein said characteristics of said first tank circuit and said characteristics of said second tank circuit include a number of turns of an inductor, a gauge of wire of an inductor, a coil diameter of an inductor, an inductance value of an inductor, and a capacitance value of a capacitor.

4. The method of claim 1 wherein the multi-input wireless power supply provides intrinsic safety and high voltage isolation.

5. The multi-input wireless power supply of claim 1 wherein said first input voltage is 110VAC and said second input voltage is 220 VAC.

6. The multi-input wireless power supply of claim 1 wherein said first input voltage and said second input voltage are selected from the group comprising 110VAC, 220VAC, 19VDC, and 5VDC, wherein said first input voltage and said second input voltage are different.

7. The multi-input wireless power supply of claim 1 wherein said sensor is located in the AC/DC rectifier circuit.

8. The multi-input wireless power supply of claim 1 wherein said microprocessor includes said sensor.

9. A multi-input wireless power supply comprising:
    a rectifier circuit capable of accepting a first input voltage or a second input voltage, wherein said rectifier circuit produces a rectified output;
    a plurality of switching circuits each coupled to said rectified output;
    a first tank circuit coupled to one of said plurality of switching circuits, wherein characteristics of said first tank circuit are selected for transferring power to a remote device as a function of said first input voltage without being converted by a DC/DC converter;
    a second tank circuit coupled to a different of said plurality of switching circuits, wherein characteristics of said second tank circuit are selected for transferring power to said remote device as a function of said second input voltage without being converted by a DC/DC converter, wherein said characteristics of said second tank circuit are different from said characteristics of said first tank circuit; and
    a microcontroller programmed to control said plurality of switching circuits.

10. The multi-input wireless power supply of claim 9 wherein said plurality of switching circuits are rated for whichever of said first input voltage and said second input voltage is higher.

11. The multi-input wireless power supply of claim 9 wherein said characteristics of said first tank circuit and said characteristics of said second tank circuit include a number of turns of an inductor, a gauge of wire of an inductor, a coil diameter of an inductor, an inductance value of an inductor, and a capacitance value of a capacitor.

12. The method of claim 9 wherein the multi-input wireless power supply provides intrinsic safety and high voltage isolation.

13. The multi-input wireless power supply of claim 9 wherein said first input voltage is 110VAC and said second input voltage is 220 VAC.

14. The multi-input wireless power supply of claim 9 wherein said first input voltage and said second input voltage are selected from the group comprising 110VAC, 220VAC, 19VDC, and 5VDC, wherein said first input voltage and said second input voltage are different.

15. The multi-input wireless power supply of claim 9 wherein said sensor is located in said rectifier circuit.

16. The multi-input wireless power supply of claim 9 including a sensor for detecting which of said first input voltage and said second input voltage is connected to said multi-input wireless power supply.

* * * * *